United States Patent [19]
Steffey

[11] Patent Number: 5,888,310
[45] Date of Patent: Mar. 30, 1999

[54] SYSTEM AND METHOD FOR CLEANING A DRIVE TRAIN OF A BICYCLE

[76] Inventor: David Steffey, 315 Ishpeming Trail, Traverse City, Mich. 49686

[21] Appl. No.: 889,977

[22] Filed: Jul. 10, 1997

[51] Int. Cl.$^6$ ................................. B08B 1/02; B08B 3/08
[52] U.S. Cl. ...................................... 134/6; 134/9; 134/40; 15/256.6; 15/256.5; 184/15.1; 184/15.3; 474/91
[58] Field of Search .............................. 134/6, 9, 15, 40; 15/105, 104.04, 160, 210.1, 256.5, 256.6; 184/15.1–15.3, 16; 474/91, 92

[56] References Cited

U.S. PATENT DOCUMENTS

| | | | |
|---|---|---|---|
| 3,712,637 | 1/1973 | Townsend . | |
| 3,931,991 | 1/1976 | Marchello | 280/295 |
| 4,578,120 | 3/1986 | Chiarella | 134/9 |
| 5,020,637 | 6/1991 | Hoenselaar et al. | 184/15.1 |
| 5,213,180 | 5/1993 | Masonek et al. | 184/15.2 |
| 5,484,038 | 1/1996 | Rowell | 184/15.1 |

OTHER PUBLICATIONS

Pp. 59 and 60 (color copies) of Bike Nashbar Catalog, Bike Nashbar, 4111 Simon Rd., Youngstown, Ohio 44152, No Date Supplied.
Pp. 55–60 (color copies) of Performance Bicycle Catalog, Performace Inc., 833 Robert C. Byrd Drive, #8 Lester Square, Sophia, WV 25921, No Date Supplied.
Pp. 56, 58, and 59 (color copies) of Bike Nashbar Catalog, Catalog No. 127, Holiday 1997, Bike Nashbar, 4111 Simon Rd., Youngstown, Ohio 44512.

*Primary Examiner*—Lyle A. Alexander
*Attorney, Agent, or Firm*—Calfee, Halter & Griswold, LLP; Sean T. Moorehead

[57] ABSTRACT

A system and method for cleaning a drive train of a bicycle, e.g., a mountain bike, that includes a novel stand, cleaning axle, tweezer brush, water nozzle, and gear cleaner used to clean the entire drive train of the bicycle or other cycle having a chain-driven drive train and a removable wheel that is driven by the chain. The stand has a base, an upright, and a pig tail hook having at least two surface portions that contact a seat post of the mountain bike, with the pig tail hook characterized in that gravity provides a retaining force for the pig tail hook to retain the seat post. The cleaning axle replaces the chain driven wheel and provides tension to the chain, allowing the chain to be cycled with the pedals and rapidly cleaned while the chain is cycled. The tweezer brush has two cleaning surfaces oppositely disposed to evenly grip the chain on opposite sides. The water nozzle has a wand to be inserted into cleaning ports in the cleaning axle to direct a cleaning fluid, e.g., water, directly onto the chain being cleaned. The gear cleaner is a thin, elongate cleaning member having a pair of wires twisted into interlocking spirals with a plurality of fiber elements clamped therebetween and is used to clean the exposed surfaces between gear plates, used to clean the gaps between teeth of the gears, and used to clean the inside surfaces of the chain.

13 Claims, 18 Drawing Sheets

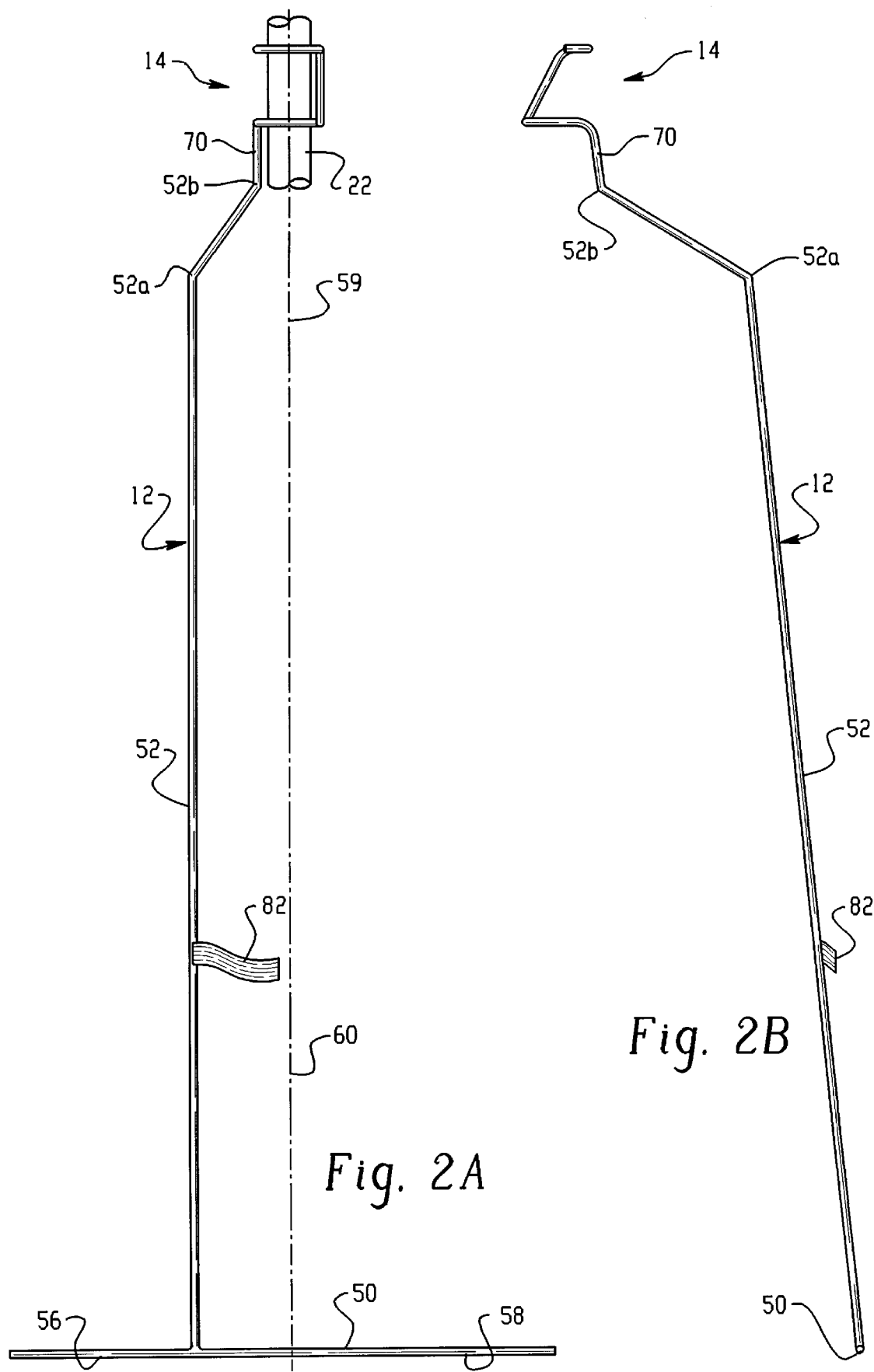

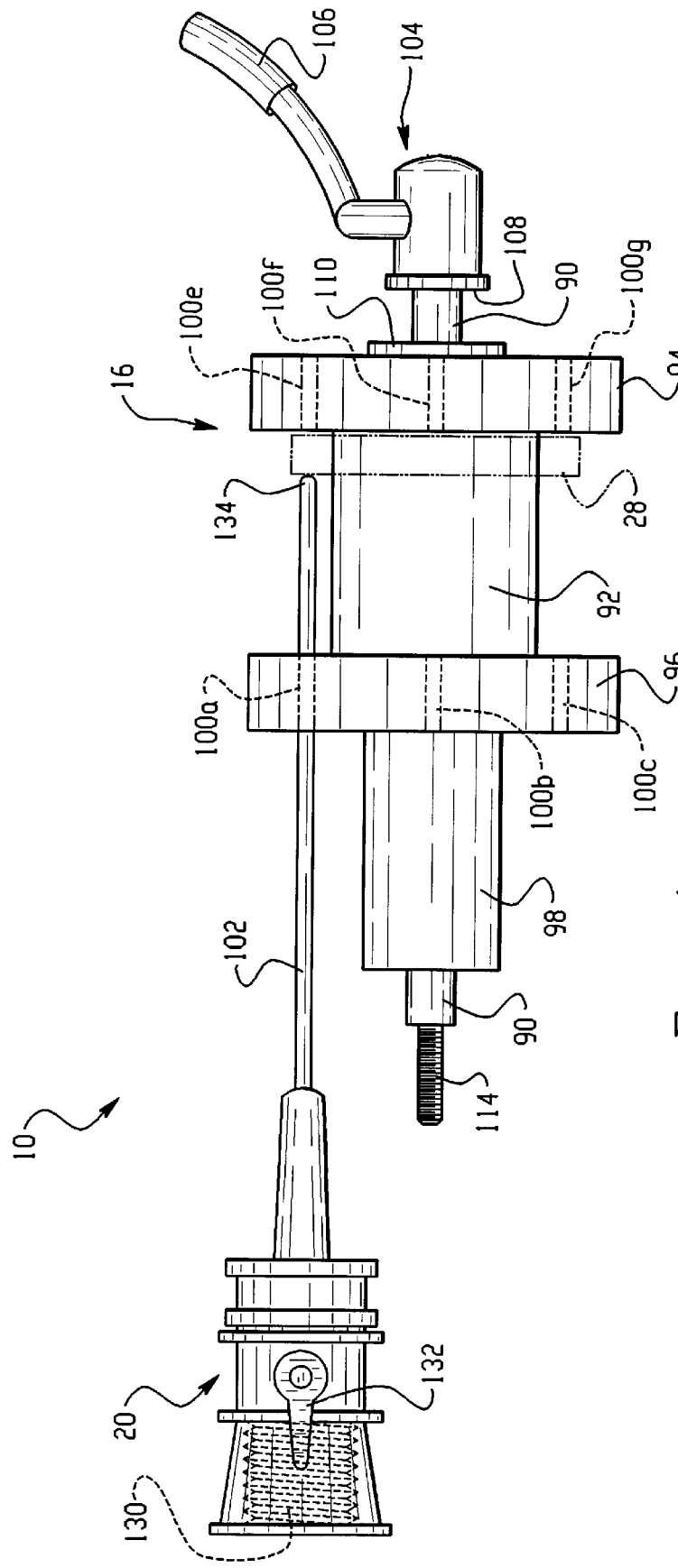

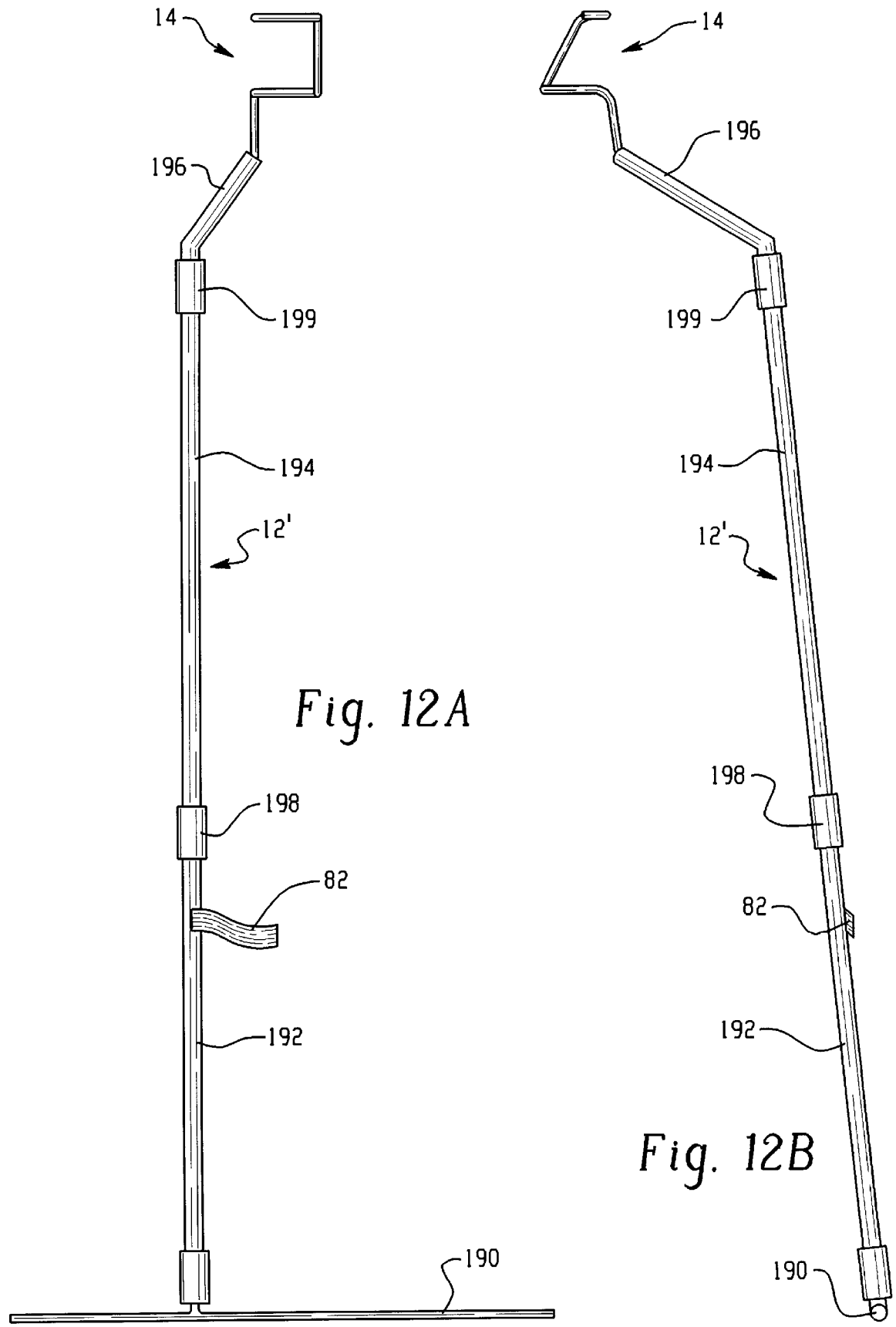

SYSTEM AND METHOD FOR CLEANING A DRIVE TRAIN OF A BICYCLE

FIELD OF THE INVENTION

The present invention relates generally to a system and method for cleaning a drive train of a bicycle and, more specifically, to a novel stand, cleaning axle, tweezer brush, water nozzle, and a gear cleaner used to clean the entire drive train of a bicycle or other cycle having a chain-driven drive train and a removable wheel that is driven by the chain.

BACKGROUND OF THE INVENTION

Mountain bikes are bicycles specifically designed and constructed for use in hilly and often dirty environments. Their frames are very sturdy but their exposed gears are their Achilles' heel. A mountain bike drive train is a typically a combination of a steel chain, aluminum front chain rings, metal or aluminum rear gears or sprockets and plastic derailleur pulley wheels. This creates ten to eleven or more exposed gears or sprockets. To work properly, these gears must be cleaned and oiled regularly. Due to the nature of mountain biking (often riding in the dirt or mud) the oiled drive train attracts dirt which leads to poor performance. Moreover, the combination of dirt and oil creates an abrasive paste that prematurely wears the aluminum and plastic parts. Consequently, the drive train of mountain bikes must be frequently cleaned, ideally after every outing.

Some prior art chain cleaning devices clean the chain without requiring that the chain be removed from the bike, but do not clean the chain wheel (front gears), rear cassette (rear gears), or derailleur pulley wheels. These devices typically comprise a solvent reservoir and one or more brushes fixed near the reservoir to facilitate cleaning the chain with the solvent. Other prior art cleaning devices require one to disassemble the entire drive train and put the components into a dedicated parts washer, which are not portable. These devices require one to "break" the chain, which weakens the chain rivet and can lead to chain breakage. Additionally, one can take the bike to a so-called self car wash, however the large powerfull spray is not controllable and exposes the cartridge, wheel bearings, and bottom bracket bearings to dirt, water, and soap under pressure. This option clearly is not portable and the user often gets as wet as the bike.

SUMMARY OF THE INVENTION

According to the present invention, a system and method for cleaning the drive train of a cycle is provided. The system includes one or more of the following devices: a stand, a cleaning axle, a tweezer brush, a water nozzle, and a gear cleaner used to clean the drive train of a bicycle or other cycle having a chain-driven drive train and a removable wheel that is driven by the chain.

The stand comprises a base and an upright having a pig tail hook connected thereto. The pig tail hook retains the seat post of the cycle such that the cycle is supported on a supporting surface by the front wheel and the stand, with the force of gravity causing the pig tail hook to apply a retaining force to the seat post. The stand is optionally collapsible, with the parts thereof being connected with connectors, such as ferrules, threaded portions, bayonet-type connections, snap-together joints, etc. As an additional modification, the ends of the stand can have a shock cord or other elastic cord connected thereto, with the remaining pieces being hollow and having the elastic cord passing therethrough. An optional strap having hook and eye surfaces can be used to further secure the stand to the cycle and, if the stand is collapsible, the strap can be used to secure the parts together when not in use.

The cleaning axle replaces the rear wheel of the bicycle when the chain is cleaned and maintains tension on the chain when taking the place of the rear wheel. The cleaning axle has an axle that is physically annexed to a chain supporting surface. The axle has dimensions similar enough to that of the rear wheel axle that the axle can be used in place of the rear wheel. The chain supporting surface provides tension to the chain while the cleaning axle replaces the rear wheel in such a manner that allows the chain to be cycled by turning the pedals of the cycle. The axle has ports which allow placement of and direction of a water nozzle toward the chain. Additionally, the cleaning axle has a cover to prevent back spray on the individual doing the cleaning. This cover also increases the water turbulence thus increasing the cleaning action upon the chain.

In use, the rear wheel is elevated and the pig tail hook of the stand is manipulated in space so as to engage the seat post. Thereafter the bicycle is released and supported by the stand with the force of gravity causing the hook to firmly retain the seat post. With the stand and the bicycle supported thereby, the rear wheel can be quickly removed and replaced with the cleaning axle which provides tension to the chain. With the cleaning axle in place the chain can be cleaned by a spray of water or other solvent while the chain is cycled by turning the pedals.

The tweezer brush facilitates cleaning the chain and derailleur pulleys. The tweezer brush has first and second cleaning surfaces operatively associated with a handle. The cleaning surfaces can comprise bristles carried by the handle. The cleaning surfaces are spaced apart to allow the chain to pass between the two cleaning surfaces and are positioned opposite one another so that the cleaning surfaces can engage opposite sides of the chain during cleaning. Water or another solvent is applied to the bristles. By closing or pinching the tweezer brush with varying degrees of pressure, the bristles can be forced between the chain rollers, the hardest part of the chain to clean. The tweezer brush can also be rotated 90 degrees to clean the side of the chain. Also, the tweezer brush can be used to clean the derailleur pulleys and chain rings, unlike other chain cleaners.

Additionally, the cleaning axle can have at least one cleaning port, which is positioned to direct a cleaning fluid toward the chain. The cleaning ports can be positioned at various positions of the cleaning axle, such as the sides and top.

The water nozzle according to the present invention has a wand that has an end with a diameter smaller than the at least one cleaning port of the cleaning axle. The end of the wand is inserted into the at least one cleaning port of the cleaning axle to clean the chain while the chain is being supported by the chain supporting surface. The other end of the water nozzle is suitable to be connected to a supply of cleaning fluid. For example, if water is the cleaning fluid and a standard garden hose is the source of water, then the water nozzle would have a threaded portion that mates with the end of a typical garden hose.

The gear cleaner is a thin, elongate, preferably cylindrical cleaning element that allows one to apply downward pressure onto the gaps between the teeth of the gears. The gear cleaner is thin enough and flexible enough to fit between the 8 speed cogs and the three chain rings. When used to clean between the teeth or cogs it is used in a manner reminiscent of using dental floss in that the gear cleaner is positioned between two teeth or cogs and at an angle skewed with respect to the plane of the gear or sprocket and then moved in a sawing motion back and forth.

It is therefore an advantage of the present invention to provide an improved system and method for cleaning the entire drive train of a cycle.

It is a further advantage of this invention to provide an improved system and method for cleaning the entire drive train of a cycle, including one or more of the following components: a stand having a pig tail hook, a cleaning axle which contains cleaning ports that replaces a wheel and maintains tension on the chain, a tweezer brush, a water nozzle, and a gear cleaner.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above and the detailed description given below, serve to example the principles of this invention.

FIG. 2A is a rear elevational view of a first embodiment of the cycle stand of the present invention;

FIG. 2B is a side elevational view of the embodiment of the cycle stand shown in FIG. 2A;

FIG. 4 is a rear elevational view of the cleaning axle and water nozzle of the present invention, with the cover of the cleaning axle removed;

FIG. 12A is a rear elevational view of a second embodiment of the cycle stand of the present invention;

FIG. 12B is a side elevational view of embodiment of the cycle stand shown in FIG. 12A.

DETAILED DESCRIPTION OF THE PREFERRED EMBODIMENT

Figure 1A:
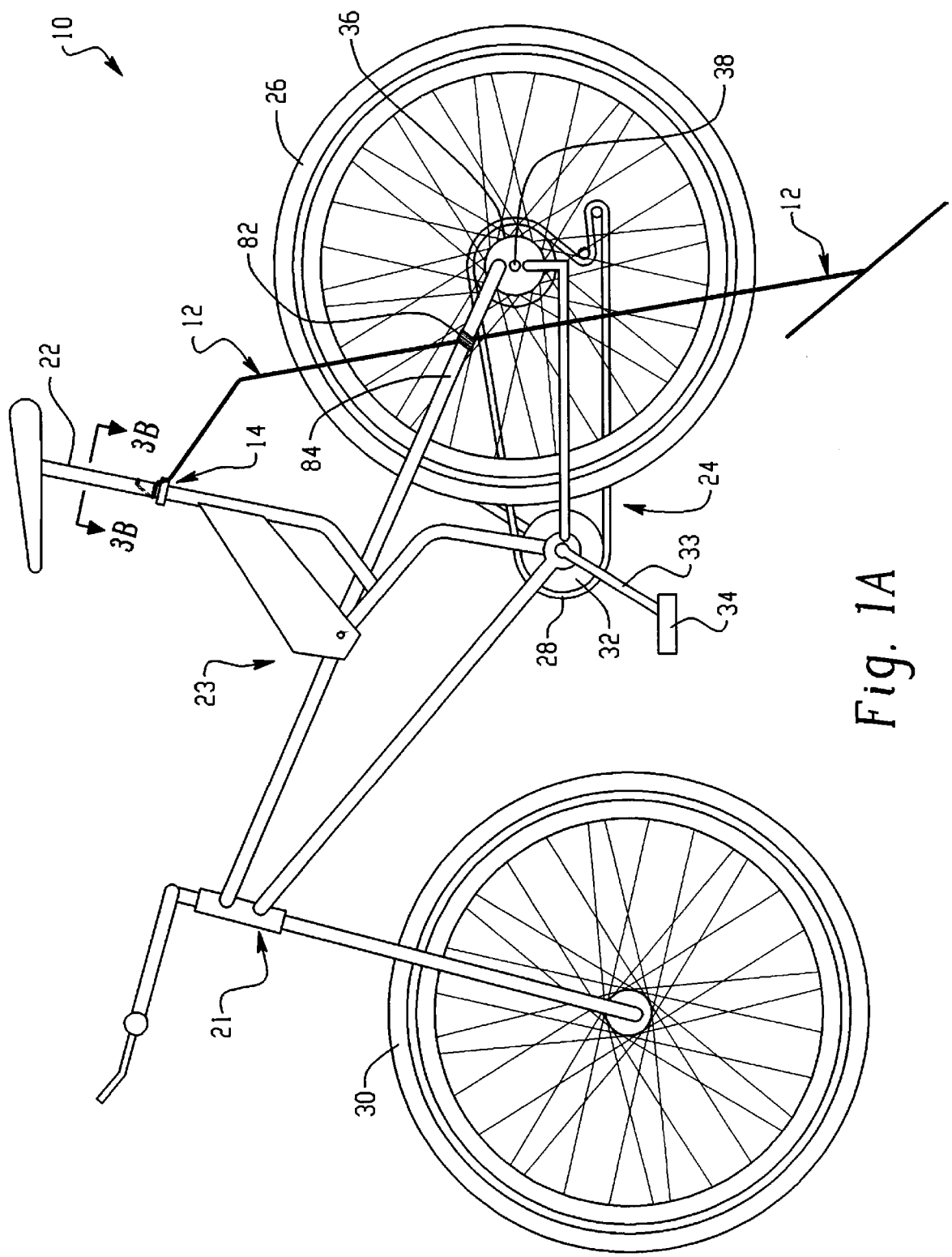
FIG. 1A is a side elevational view of the cycle stand of the present invention in operation, elevating a rear wheel of a bicycle.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, a cleaning system embodying the present invention is there shown and generally indicated at 10. As mentioned hereinabove, the cleaning system 10 may include one or more of the following: a stand 12 having a pig tail hook 14, a cleaning axle 16, a tweezer brush 18, a water nozzle 20, and a gear cleaner 19.

Figure 1B:
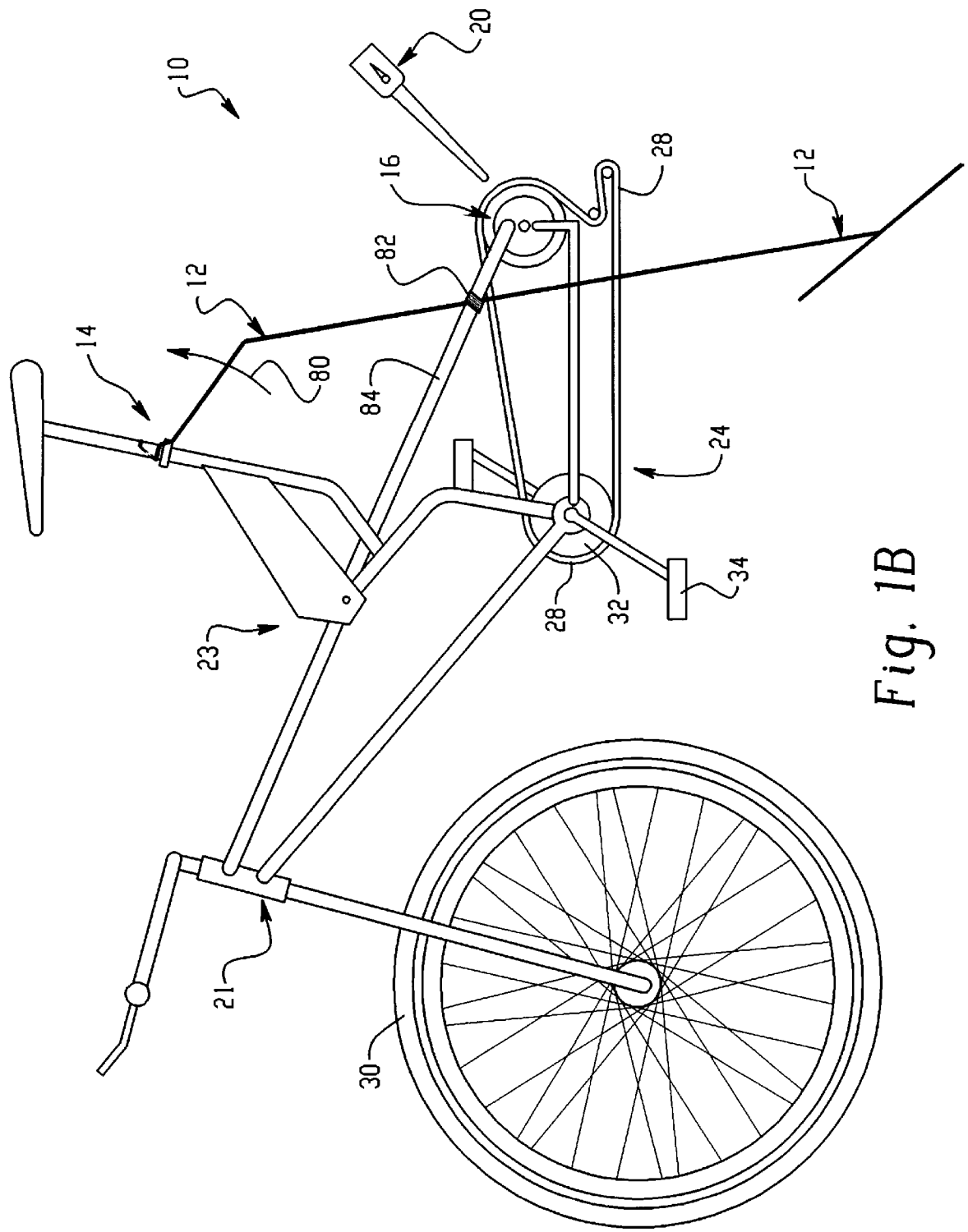
FIG 1B is a side elevational view of the cycle stand of the present invention in operation, with the rear wheel of the bicycle removed.
Figure 3A:
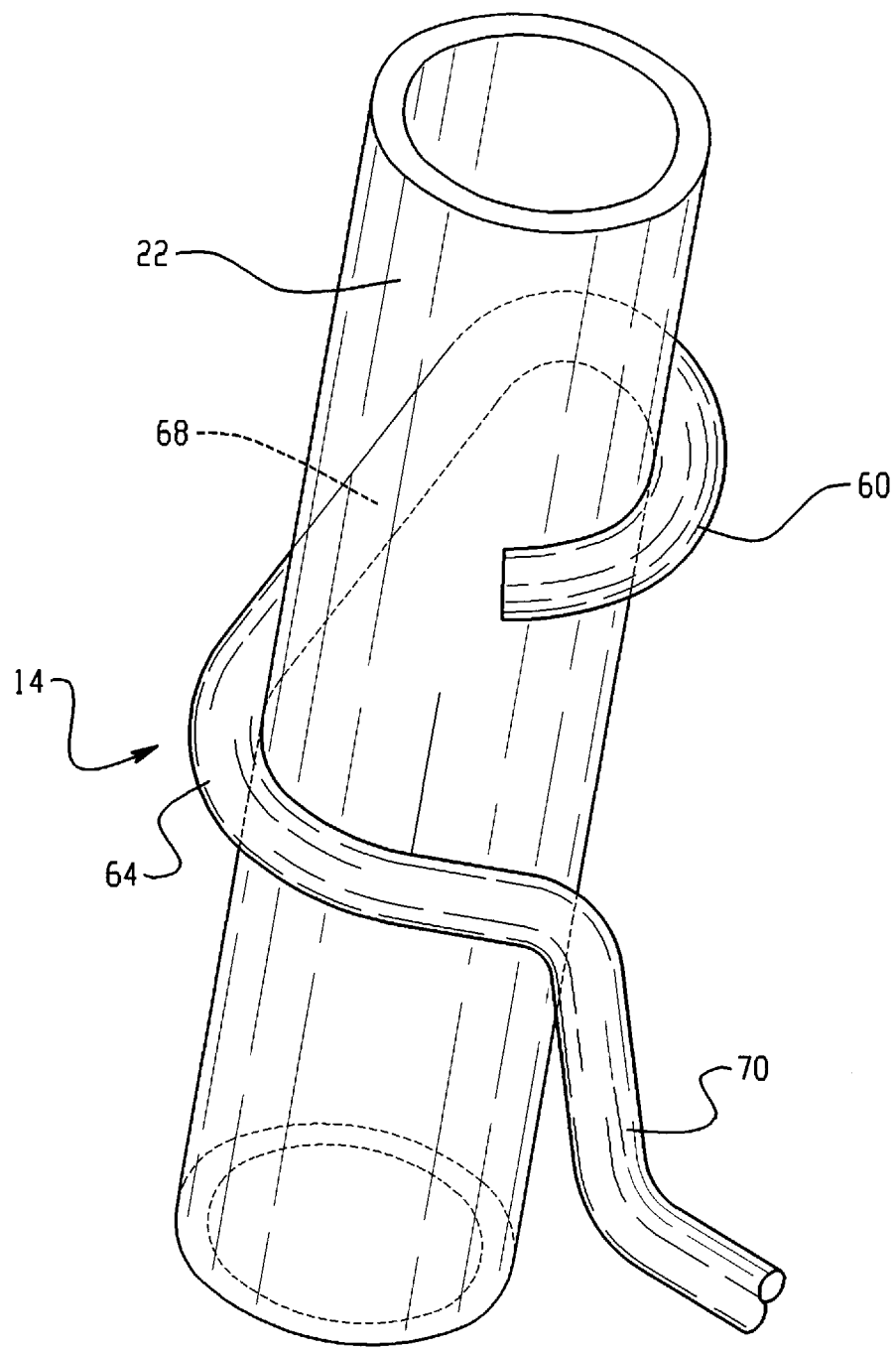
FIG. 3A is a perspective view of the "pig tail hook" portion of the cycle stand of the present invention.
Figure 3B:
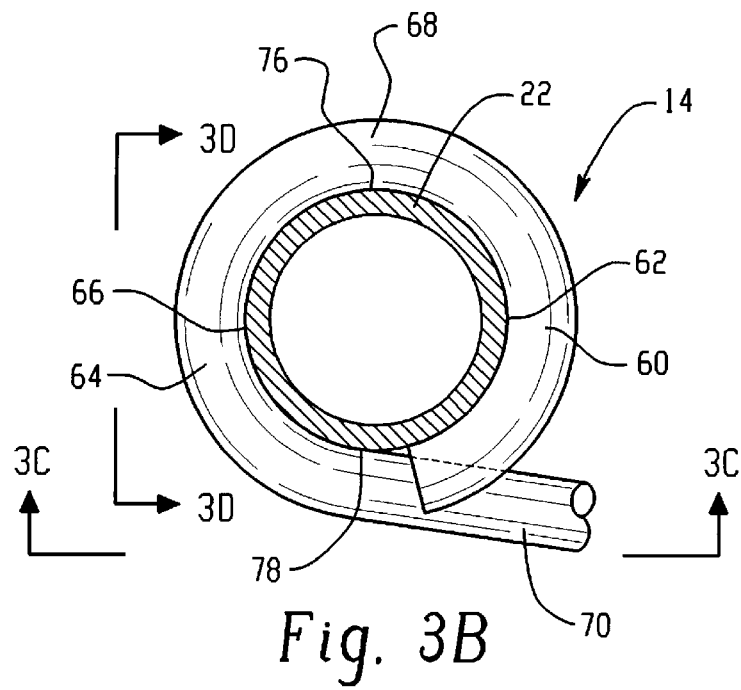
FIG. 3B is a sectional view of the pig tail hook and seat post taken substantially along the plane designated by the line 3B—3B of FIG. 1A.
Figures 3C, 3D:
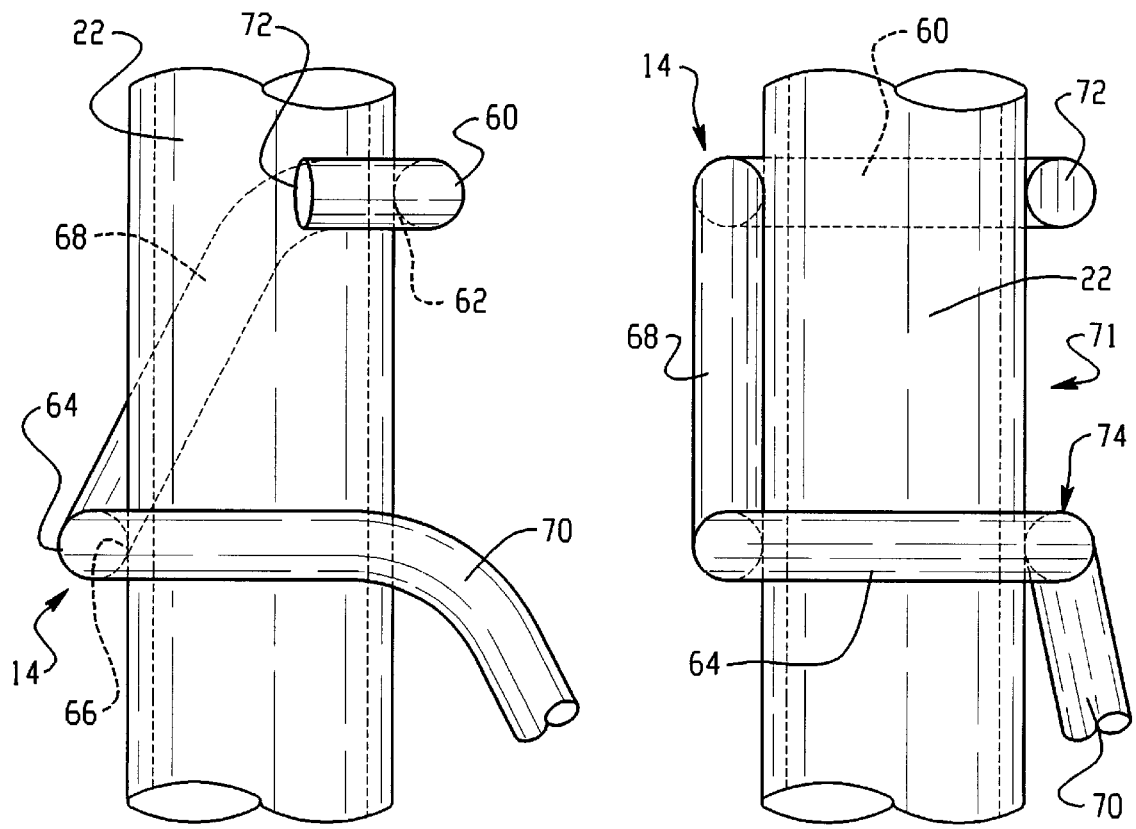
FIG. 3C is a side elevational view of the pig tail hook and seat post as seen from the bottom of FIG. 3B.
FIG. 3D is a front elevational view of the pig tail hook and seat post as seen from the left side of FIG. 3B.
Figure 5A:
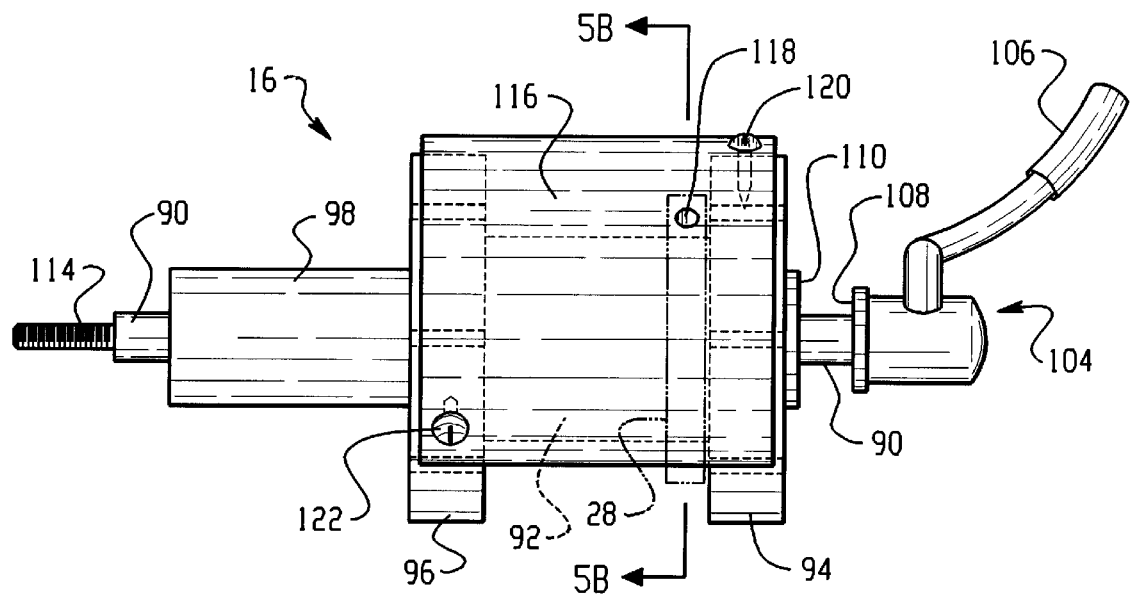
FIG. 5A is a rear elevational view of the cleaning axle of the present invention.
Figure 5B:
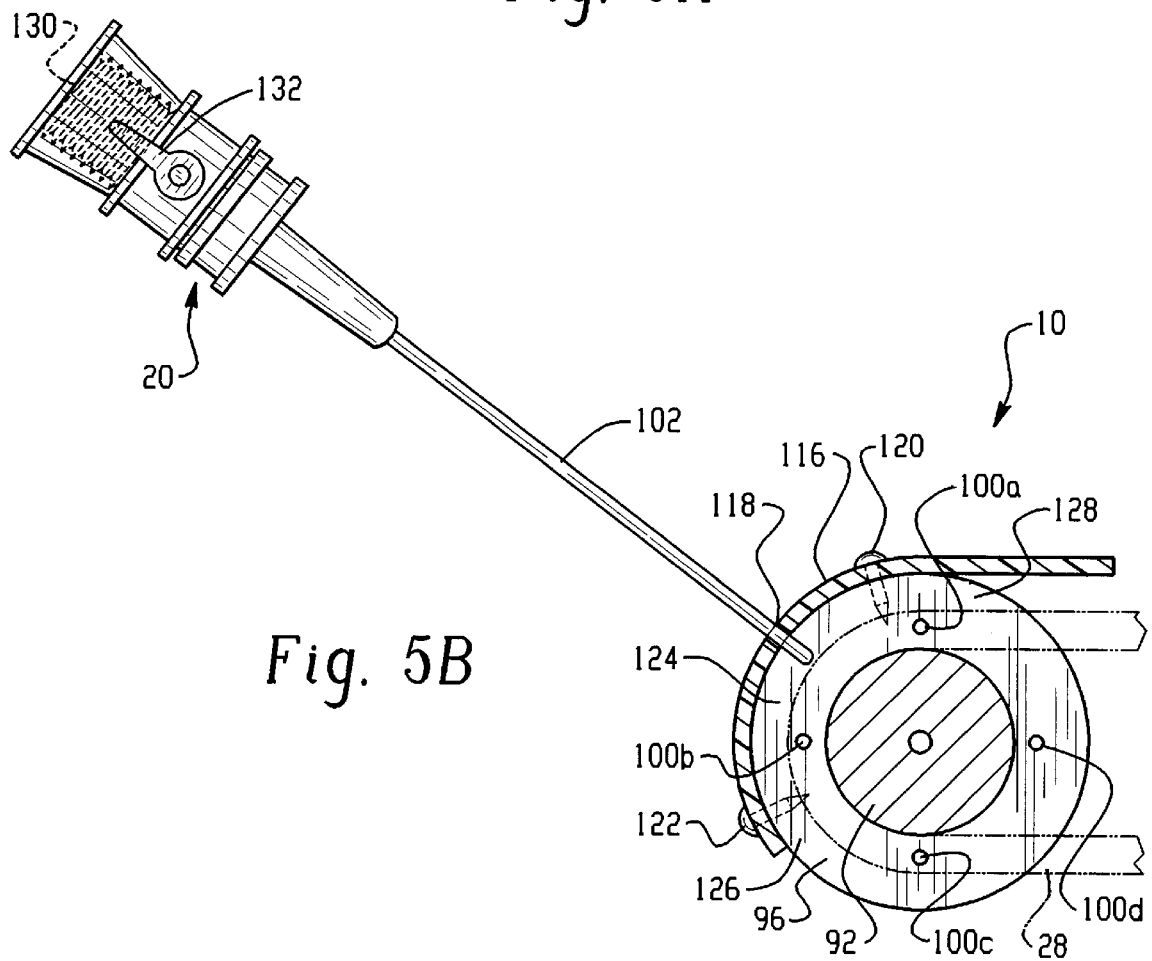
FIG. 5B is a sectional view taken substantially along the plane designated by the line 5B—5B of FIG. 5A also showing the water nozzle of the present invention in use.
Figure 6:
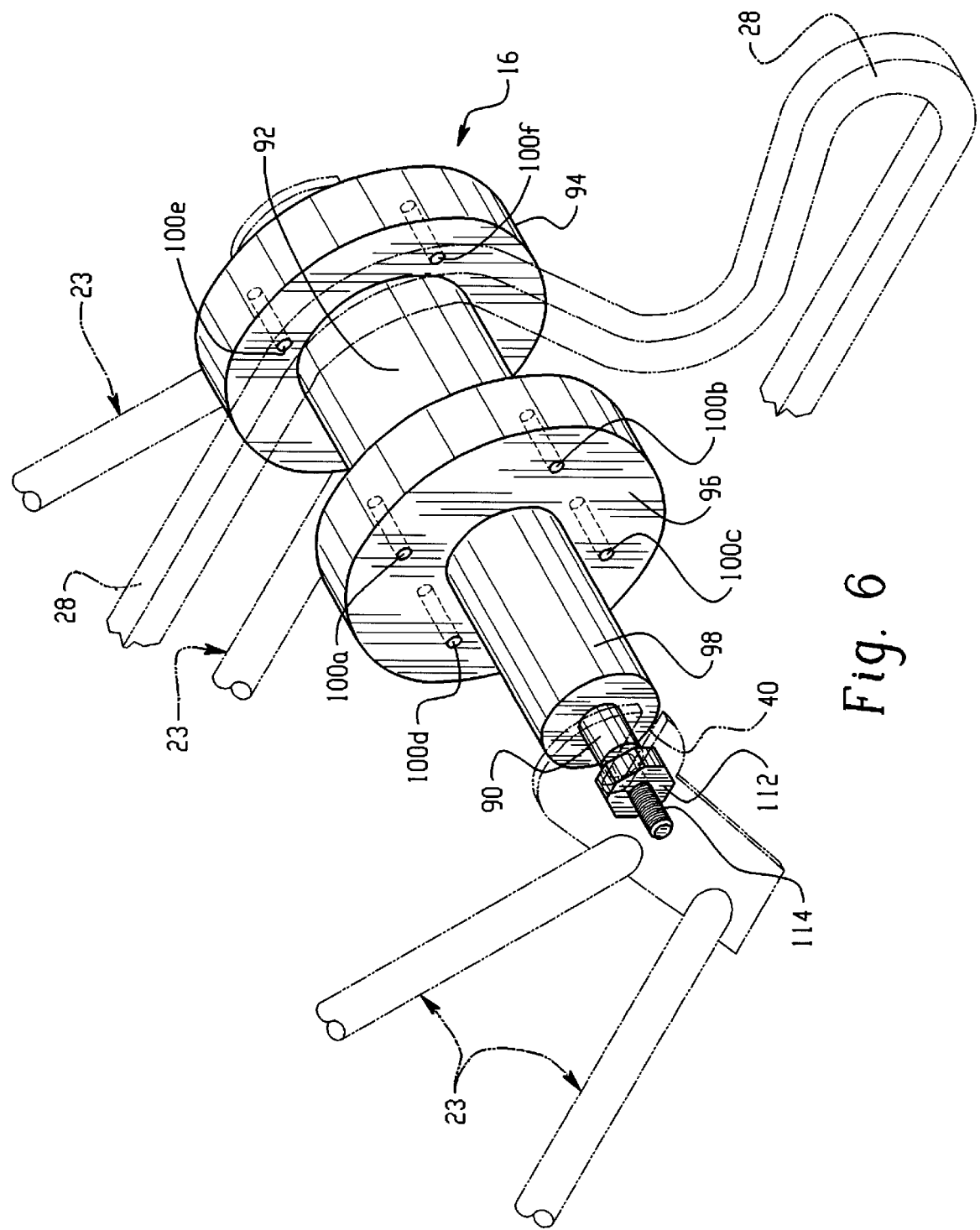
FIG. 6 is a perspective view of the cleaning axle of the present invention, with the cover of the cleaning axle removed.
Figure 7:
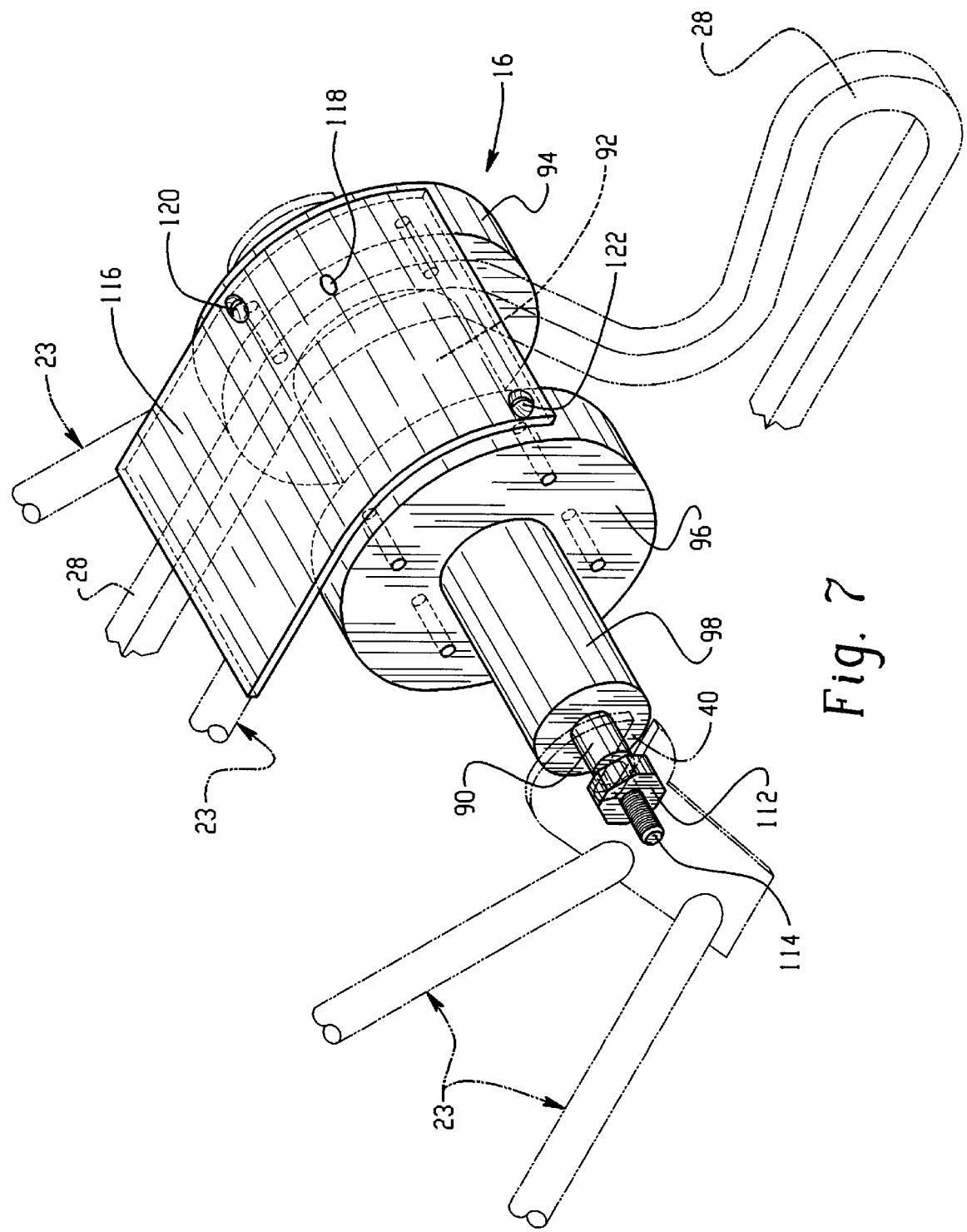
FIG. 7 is a perspective view of the cleaning axle of the present invention, with the cover of the cleaning axle in place.

As shown in FIGS. 1A and 1B, the stand 12 of the present invention can be applied to any cycle 21 having a usual seat post 22 physically annexed to a frame 23 of the cycle 21 in the usual manner. The cycle 21 shown in FIGS. 1A and 1B also has a chain-driven drive train 24 and a removable wheel 26 that is driven by the chain 28. As known to those in the art, the drive train 24 comprises at least one main gear or main sprocket 32, which is rotated by a plurality of crank arms 33 and associated pedals 34, the chain 28, and at least one wheel gear or wheel sprocket 36 associated with the removable wheel 26. As also known to those in the art, the wheel 26 has associated therewith a wheel axle 38 that is retained in openings 40 (FIGS. 6–8) in the frame 23. In FIG. 1A, the rear wheel 26 is held off a supporting surface, (e.g., the ground) and the cycle 21 is supported by the stand 12 and a front wheel 30, both of which rest on the supporting surface. In FIG. 1B, the rear wheel 26 has been removed and replaced with the cleaning axle 16 of the present invention.

Referring now to FIGS. 2A, 2B, and 3A–3D, a first embodiment of the stand 12 according to the present invention is shown. The stand 12 comprises a base 50, an upright 52, and the pig tail hook 14. The base 50 preferably has a shorter section 56 and a longer section 58, with the longer section 58 of the stand 12 extending below the frame 23 of the cycle 21 during use. Preferably the sections 56, 58 are configured such that an imaginary plane 59 (FIG. 2A) extending through the center of the seat post 22 bisects the base 50 to provide equal support for both sides of the cycle 21. Many prior art cycle stands have one or more legs or rods that engage the supporting surface; these legs/rods tend to sink into a soft supporting surface. The wide contact surface of the base 50 of the stand 12 of the present invention provides support for the cycle 21 on most surfaces, including soft earth and sand. The base 50 is connected to the upright 52. The upright 52 has a series of bends 52*a*, 52*b* that collectively serve to position the base 50 behind the pigtail 14 (relative to the supporting wheel 30) and to allow the upright to clear the frame 23 on one side of the cycle 21. Connected to the upright 52 is the pig tail hook 14, which engages the seat post 22 in such a manner that the force of gravity causes the pig tail hook 14 to apply a retaining force to the seat post 22, thus eliminating the need for any moving parts and allowing the stand to automatically adjust to any of many diameter seat posts.

The pig tail hook 14 has a rear section 60, which has a rear engagement surface portion 62 that engages the rear of the seat post 22, and a front section 64, which has a front engagement surface portion 66 that engages the front of the seat post 22. The rear section 60 and the front section 64 are physically connected by a connecting section 68 and the pig tail hook 14 is physically connected to the upright 52 via a stem 70. The gap 71 between the end 72 of the pig tail hook 14 and the point 74 where the stem 70 bends and connects to the front section 64 must be wide enough to easily insert the seat post 22 between the two engagement surface portions 62, 66. Although in FIGS. 3A–3D the pig tail hook 14 is shown tightly hugging the seat post 22, the hook 14 need not so hug the post 22. To accommodate a variety of seat post thicknesses and to facilitate inserting the seat post 22 into the stand 12, it might be preferable to design the pig tail hook 14 to have a gap at the point 76 between the connecting section 68 and the seat post 22 and another gap at the point 78 between the stem 70 and the seat post 22.

The stand 12 is used by: (i) lifting the cycle 21 off of the ground, (ii) moving the stand 12 into a position so that the opening 71 of the pig tail hook 14 is opposite the seat post 22 (the stand base 50 will be further clockwise than in FIG. 1, using the seat post as a virtual pivot point), moving the stand 12 so that the seat post enters the opening 71, and rotating the stand 12 counterclockwise (FIGS. 1 and 3C) causing the engagement surfaces 62, 66 to engage the seat post 22. Once the seat post 22 is inserted into the opening 71, the front wheel 30 can be released to the supporting surface. After the engagement surface portions 62, 66 engage the seat post 22, the stand base 50 can also be released to the supporting surface. As the stand base 50 is released to the supporting surface (e.g., the ground), the force of gravity causes the stand 50 rotate in a clockwise direction 80 (FIG. 1B) about the engagement surface portions, which tends to urge the engagement surface portions 62, 66 into further engagement with the seat post 22. This force tends to retain the seat post 22 between the engagement surface portions 62, 66. No portion of the pig tail hook 14 closes around the post 24; all the parts of the hook 14 are preferably rigidly connected. Thus, the engagement of the post 24 by the hook 14 is in a sense a frictional engagement.

In a similar fashion, by turning the stand 12 around, the stand 12 of the present invention can be used to raise the front wheel 30 off of the supporting surface for inspection or cleaning. In this case the cycle 21 is supported by the stand and the rear wheel 26.

Next, a strap 82 can be used to further secure the stand 12 against the frame 23 of the cycle 21. The strap 82 can either be loose or secured to the stand and can be made of any suitable strapping material such as a strip of material having hooks on one side and loops the other side (e.g., those hook and loop surfaces sold under the trade name "VELCRO"). In use, the strap 82 is tightly wound one or more times around both the stand 12 and a frame member 84 in such a manner that the hooks on the strap engage the loops, thereby laterally securing the stand 12 to the frame member 84 of the frame 23 of the cycle 21. With the stand 12 in place, the cycle 21 is held for cleaning or inspection, e.g., cycling the drive train by turning the pedal 24 and/or shifting gears. Since the stand 12 engages the seat post 24, the stand can be used on virtually any adult bicycle, including those having radically different frames, e.g., radically designed suspension bikes with unconventional frames, unconventional frame tube diameters, unconventional pivot points, unconventional cable routing, and unconventional rear shock and linkage systems.

The stand 12 is preferably made of powder-coated metal, e.g., steel or aluminum. In FIGS. 2A, 2B, and 3A–3D the pig tail hook 14 is shown being made from a single piece of bent material, e.g., steel or aluminum. Consequently, in the embodiment shown the connecting section 68 and the stem 70 are on opposite sides of the seat post 22; however, this need not be the case. Other stands embodying the principles of the present invention need not be so configured. For example, the stem 70 of the pig tail hook 14 can have a "Y" at its end, with the rear "C" shaped section 60 extending from one tine of the "Y" and the front "C" shaped section 64 extending from the other tine of the "Y" (all not shown). As another example, all the sections 62, 64, 68 need not be completely curved. The important aspect of the pig tail hook is that there are at least two surface portions, e.g., surface portions 62 and 66, that engage opposite sides of the seat post 22 in such a manner that the force of gravity causes the pig tail hook to apply a retaining force to retain the seat post 22 and, consequently, to apply a retaining force to the cycle 21.

Referring now to FIGS. 4, 5A, 5B, and 6–8, the cleaning axle 16 and nozzle 20 of the present invention are shown. The cleaning axle 16 shown comprises an axle 90 in operative engagement with a series of cylindrical sections: a chain support section 92, two chain retention sections 94, 96, and an extension section 98. The cleaning axle 16 replaces the rear wheel 26, its associated wheel sprocket 36, and wheel axle 38, with the axle 90 being retained in the openings 40 in the frame 23. Allowing the rear wheel 26 to be removed prevents the cassette and wheel bearings from being damaged by the spray and solvents associated with cleaning the cycle 21. The rear wheel and rear cassette are cleaned using the gear cleaner and low pressure spray from the adjustable nozzle. While in place, the chain support section 92 acts as a chain support surface that provides tension to the chain 28 and allows the chain to be cycled by turning the pedals 34. The tension on the chain prevents the spring loaded chain tensioner on the derailleur from folding backwards, thus allowing free access to the derailleur pulley wheels. Also the diameter of the cleaning axle takes up enough chain to keep the derailleur tensioner working and the chain taut. The chain support section 92 of the cleaning axle 16 has a diameter approximately the same as one of the at least one wheel sprockets 36 so that the chain 28 remains properly tensioned. The two chain retention sections 94, 96 have a larger diameter than the chain support section 92 and prevent the chain 28 from slipping off either end of the chain support section 92 when the chain 28 is cycled with the pedal 34. The diameter of the extension section 98 is not critical; since the extension section 98 positions the other sections 92, 94, 96 with respect to the axle 90, it can have a diameter significantly narrower than the other sections 92, 94, 96. The sections 92, 94, 96, 98 can all be made of any suitable light weight, rigid material such as wood, plastic, polymer, etc. and two or all of the sections can be made separately and then physically annexed, made integrally, or made separately and then held in place by the frame 23 when in use. Since the chain 28 slides over the outer surface of the chain support surface 92 and the chain retention surfaces 94, 96, these pieces should be made of a relatively durable material that can withstand repeated sliding contact of a chain. Although the sections 92, 94, 96, 98 are shown in the figures as being cylindrical, they need not be so. The critical aspects of the cleaning axle 16 is that it replace the wheel 26 being driven by the drive train 24, that it provide some tension on the chain 28, and that it retain the chain 28 as the chain is cycled by the drive train 24.

The cleaning axle 16 is retained in the openings 40 in the frame 23 in any of the usual ways known to those in the art for retaining a wheel axle 38, e.g., a quick-release device 104 such as those having a lever 106 that forces two surfaces 108, 110 together to sandwich and hold a portion of the frame 23 with the axle 90 in the frame opening 40, and/or a nut 112 or wing nut (not shown) secured to a threaded portion 114 of the axle 90.

The two chain retention sections 94, 96 each preferably have a plurality of cleaning ports 100a–100h that extend therethrough. These cleaning ports 100a–100h are of a sufficiently large diameter to allow a separate wand 102 of the water nozzle 20 to be inserted through one of the cleaning ports, e.g., port 100a, to direct a cleaning fluid directly onto the chain 28 to clean the chain 28. In the alternative, the cleaning axle 16 can have a series of internal ducts (not shown) that direct a cleaning fluid from a common site (e.g., a common threaded "hose" connection) to various areas of the chain 28, e.g., top, bottom, and both sides. Such a common site of cleaning fluid can be positioned in the region of the extension section 98.

The cleaning axle 16 also preferably has a cover 116, which creates a spray chamber 124 and helps prevent stray cleaning fluid from being sprayed on the user which creates more turbulence and increases the cleaning action. The cover preferably has at least one cleaning port 118 positioned proximate to the chain 28 (e.g., directly above the chain 28) extending through the cover 116 to allow the wand 102 to be inserted to direct cleaning fluid directly onto the chain 28. The cover 116 is held in place with any of a number of common temporary fasteners, e.g., screws 120, 122, snaps (not shown), hook and loop surfaces (not shown), wing nuts (not shown), etc. In the alternative, the cover 116 can be molded integrally with cleaning axle and formed so as to be flexible enough to move between open and closed positions. With the cover 116 in place, the spray chamber 124 is formed. The cleaning fluid sprayed through the ports 100, 118 circulates within the chamber and forms eddies of cleaning fluid within the chamber 124 before exiting through either end 126, 128 of the chamber 124. These eddies further clean the chain 28. In the alternative to the separate cover 116, the cover can be made integrally with the sections 94, 96 with an opening allowing the chain 28 to be inserted onto the cleaning chamber 124.

Using the cleaning axle 16 according to the present invention is very straightforward. First, the wheel 26 is elevated, for example, by the stand 12 of the present invention. Then the fasteners (not shown) retaining the wheel 26 in the frame 23 are removed in the usual manner. If the cover 116 is secured, it is removed. Next, the now untensioned chain 28 is placed over the chain support surface 92, the axle 90 is positioned in the openings 40 in the frame 23, which tensions the chain 28, and the axle 90 is secured using the temporary retainer, e.g., quick release lever 104 or nut 112. With the cleaning axle 16 in place, the pedal 24 can be turned, which cycles the chain 28 via the rotation of the main sprocket 32. Although obviously the user cannot "change gears" using the at least one wheel sprocket 36 (because the wheel 26 has been removed), the user can change the gearing of the at least one main sprocket 32 in the usual manner while turning the pedal 24.

With the cleaning axle 16 in place, the chain 28 can be cleaned with a jet of cleaning fluid (e.g., water from a common garden hose) while cycling the chain 28 by rotating the pedal 24. However, preferably the cover 116 is installed and the chain 28 is cleaned with a jet of cleaning fluid from the water nozzle 20.

The water nozzle 20 has a wand 102 that can be inserted into the various cleaning ports 100, 118 of the cleaning axle 16 to direct cleaning fluid directly onto the chain 28. The nozzle 20 also has a wider threaded end 130 opposite the wand 102. Since the nozzle steps down in diameter from about ½ of an inch at the threaded end 130 to about ⅛ of an inch at the wand 102, there is a resulting increase in pressure of the jet of fluid, which serves to further clean the chain 28. Additionally, the nozzle 20 preferably has a valve 132 that turns the flow of fluid on and off and also controls the pressure and volume of the fluid being directed at the drive train 24. Since the wand 102 is very narrow and is at least several inches long, the cleaning fluid can be directed precisely where it is needed and, moreover, the wand 102 can be inserted into the hollow handle of a brush (not shown) to spray fluid in conjunction with the cleaning action of the brush bristles.

Figure 8:
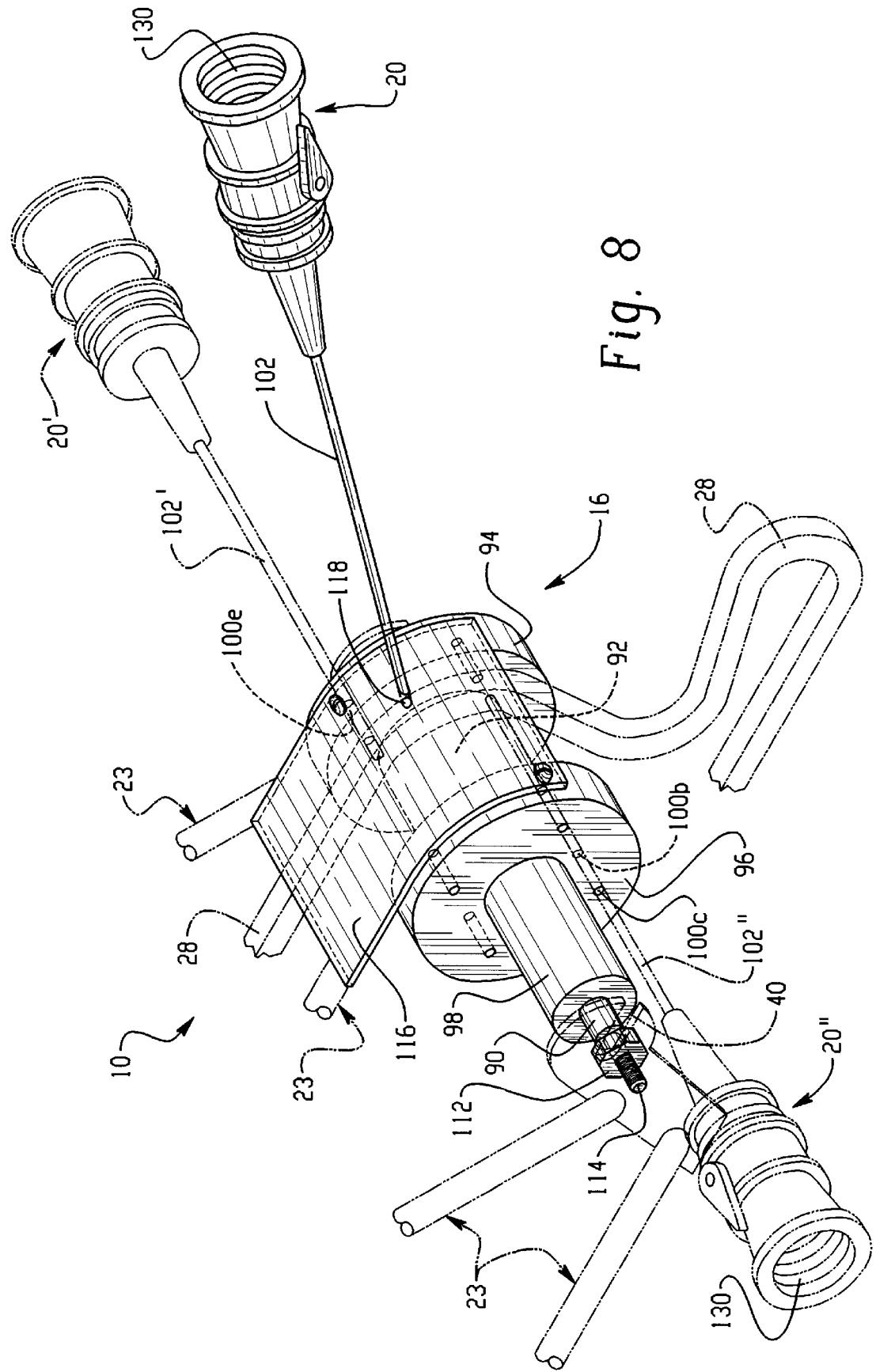
FIG. 8 is a perspective view of the cleaning axle of the present invention, showing the wand of the water nozzle inserted into various cleaning ports of the cleaning axle.

The nozzle 20 is used to clean many parts of the cycle 21, including the wheels 26, 30, the frame 23, and the drive train 24 including the chain 28, main sprockets 32, and wheel sprockets 36. The nozzle 20 is particularly helpful at cleaning the chain 28 when used with the cleaning axle 16. As shown in FIG. 8 the wand 102 of the nozzle 20 can be sequentially inserted into a plurality of the cleaning ports 100, 118 a fraction of an inch away from the chain 28 to clean the chain 28 from various angles. For example, with fluid jetting out of the end 134 of the wand 102 and while turning the pedal 24 to cycle the chain 28, the end 134 of the wand 102 can be sequentially inserted into port 118 for several turns of the pedal 24, then into port 100e for several turns of pedal 24, and finally into port 100b for several turns of pedal 24. Since the nozzle has a small diameter and a control valve, it can be directed precisely where it is needed and under the optimal pressure for best cleaning while lessening any contamination of the bearings that might otherwise be caused by a wide high-pressure spray.

Figure 9:
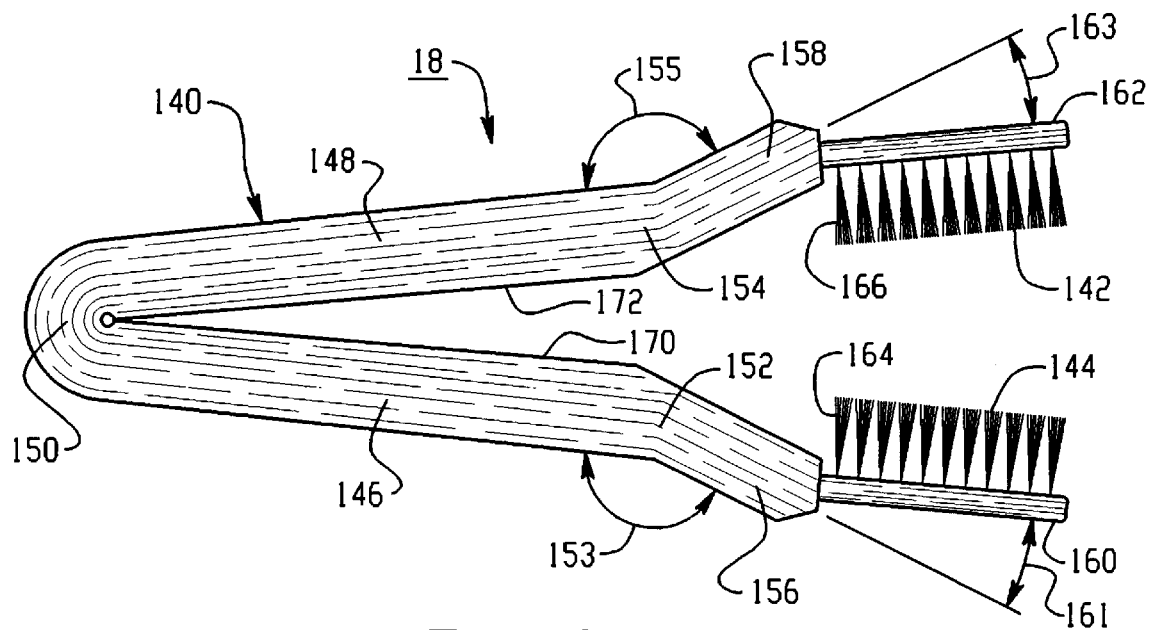
FIG. 9 is a side elevational view of the tweezer brush of the present invention in an unactuated state.
Figure 10:
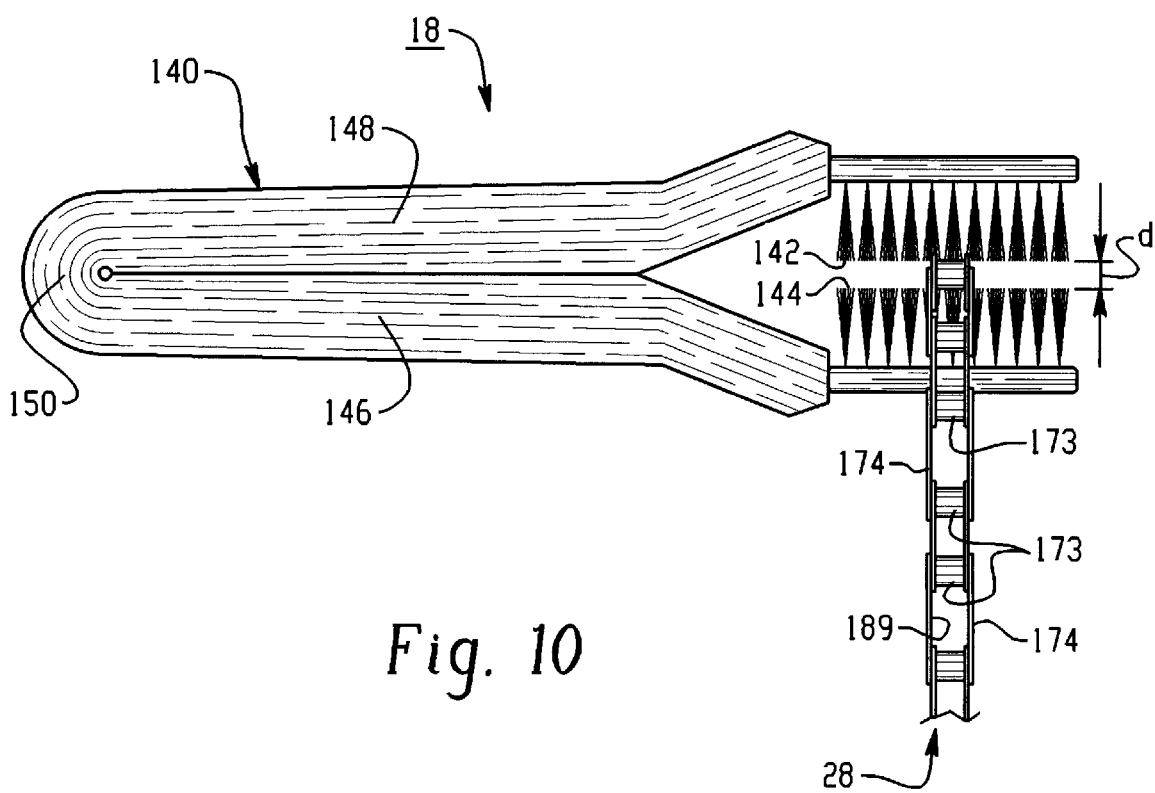
FIG. 10 is a side elevational view of the tweezer brush of the present invention in an actuated state, as when cleaning a bicycle chain.

Referring now to FIGS. 9 and 10, the tweezer brush 18 of the present invention is shown. The tweezer brush 18 has a handle 140 operatively associated with a pair of oppositely disposed cleaning surfaces 142, 144. In the particular embodiment of FIGS. 9 and 10 the handle 140 comprises two sections 146, 148 flexibly connected at the end 150 opposite the cleaning surfaces 142, 144. In that embodiment the sections 146, 148 are made of an integral piece of flexible material; however, they need not be so made. Sections 146 and 148 also include bends 152, 154 forming up-turned portions 156, 158, which form angles 152 and 154, respectively. These portions 156, 158 are connected to bristle beds 160, 162, into which bristles 164, 166 are embedded. The bristle beds 160, 163 are positioned at angles 161, 163 with respect to the longitudinal axis of sections 156 and 158, respectively. Optimally the heads of the brush need to be rotated 90 degrees from that shown in FIGS. 9 and 10 so that more brush surface area is in contact with the chain. The angles 153, 155 and the angles 161, 163 are preferably selected such that when the tweezer brush is actuated (i.e., inner surfaces 170, 172 in FIG. 9 are touching, as shown in FIG. 10), the oppositely disposed cleaning surfaces 142, 144 are parallel at a fixed, predetermined distance d away from each other. This distance d is preferably shorter than the diameter of the rollers 173 of the chain 28 so that both sides of the rollers 173 are cleaned, but not so small that the tweezer brush bristles 164, 166 bind with the chain 28 when the brush 18 is filly actuated (FIG. 10). If the bristles 164, 166 are sufficiently soft, a distance d of zero inches can be used. In the relaxed position (FIG. 9) the cleaning surfaces 142, 144 are at a distance greater than distance d from each other to allow the chain 28 to be inserted between the cleaning surfaces 142, 144. The opposing forces of the brush head sandwich the chain thus allowing enough force to be applied to push the bristles between the rollers, without overcoming the spring tension of the chain tensioner of the derailleur. Applying enough pressure on the chain to clean the chain with a regular brush is enough to cause the chain to sag, further tensioning the spring loaded chain tensioner on the derailleur. To much pressure will damage the spring of the chain tensioner. Also, the brush can be rotated 90 degrees to clean the outside edges 174 of the chain. This balanced pressure keeps the chain on the front sprocket so it does not fall off and prevents damaging lateral forces from being transmitted to the derailleur pulley wheels.

The handle 140 can be made of many materials, such as plastics, polymers, or metals and sections 146, 148 can be one piece or separate pieces hinged with a pin (not shown). Bristles can be embedded within the handle or strip brushes can be attached to the handle. Common tooth brushes can be used for the bristle beds 160, 162 and bristles 164, 166. In that case the handles of the toothbrush are either shortened and inserted into openings in the handle 140 or the unshortened handles are bent to angles 153, 155, 161, and 163 and attached at their end 150. Other embodiments making use of the benefits of the tweezer brush of the present invention are possible. For example, the sections 146, 148 can be connected at approximately their middles with a pin, like a pair of scissors (not shown). As another example, cleaning surfaces other than bristles can be used.

Using the tweezer brush 18 of the present invention to clean a chain 28 is very straightforward. Preferably the cycle 21 is placed in the stand 12 and the wheel 26 is removed and replaced with the cleaning axle 16. The tweezer brush is then positioned in its relaxed position (FIG. 9) with the chain between the cleaning surfaces 142, 144. Then the handle portions 146, 148 are squeezed until the surfaces 170, 172 meet, with the bristles 164, 166 thereby sandwiching the chain 28 (FIG. 10). With the brush 18 maintained in its FIG. 10 position, the pedal 24 is turned for several cycles to cause the chain 28 to rapidly cycle. The cycling chain 28 is rapidly cleaned by the cleaning surfaces 142, 144 sandwiching the chain 28. During this cleaning process, the cleaning surfaces apply equal but opposite pressure to opposite sides of the chain 28. Importantly, the brush 18 is held stationary so that the chain is not forced off the drive train members. After the chain 28 is clean, the pressure on the handles is released, which causes the bristles to release the chain 28. In a similar "sandwich" fashion, the tweezer brush can be used to clean derailleur pulley wheels, which cannot withstand much lateral force being applied to them.

Figure 11A:
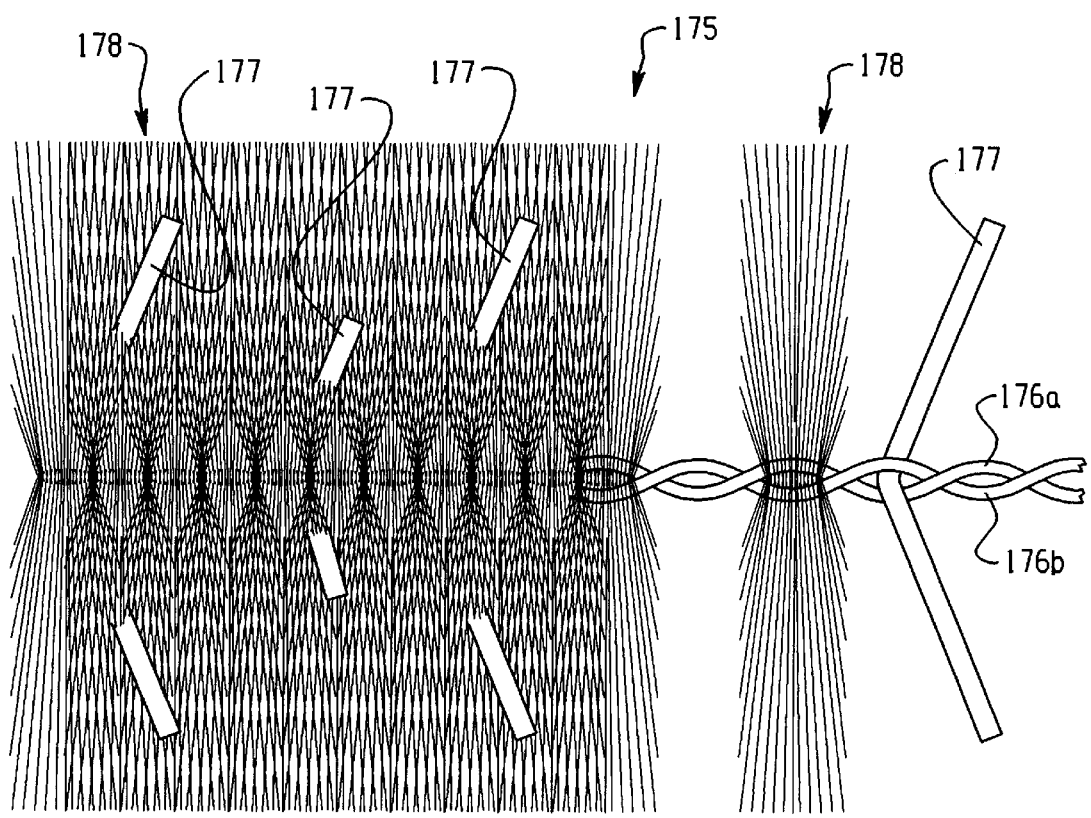
FIG. 11A is a side view (partly in elevation and partly with a majority of fine fiber elements removed) of a material used to form a thin, elongate gear cleaner according to the present invention.
Figure 11B:
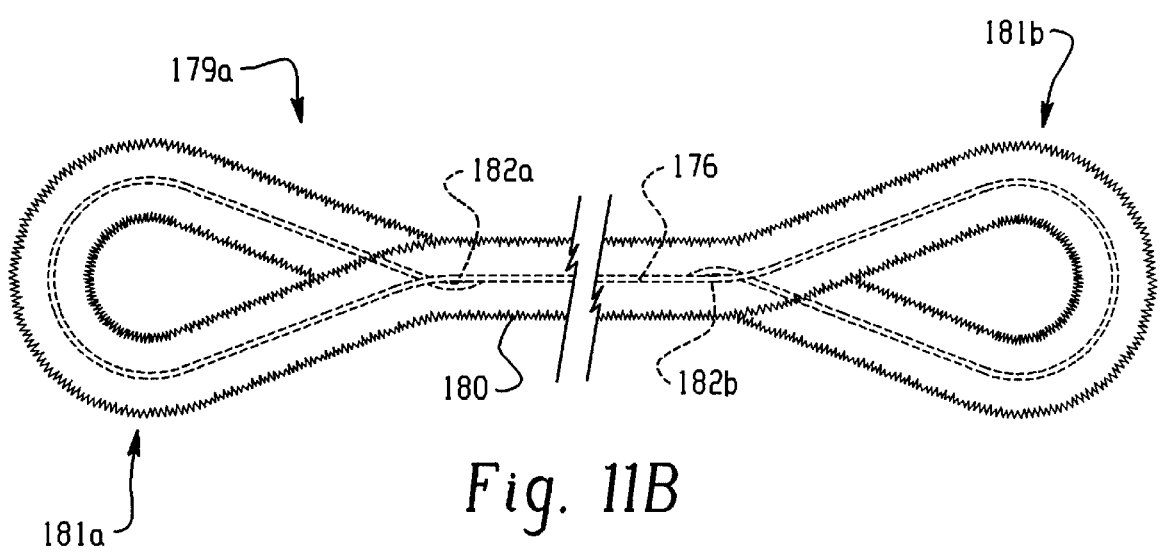
FIGS. 11B, 11C, and 11D are side elevational views showing three different embodiments of the gear cleaner according to the present invention.
Figure 11C:
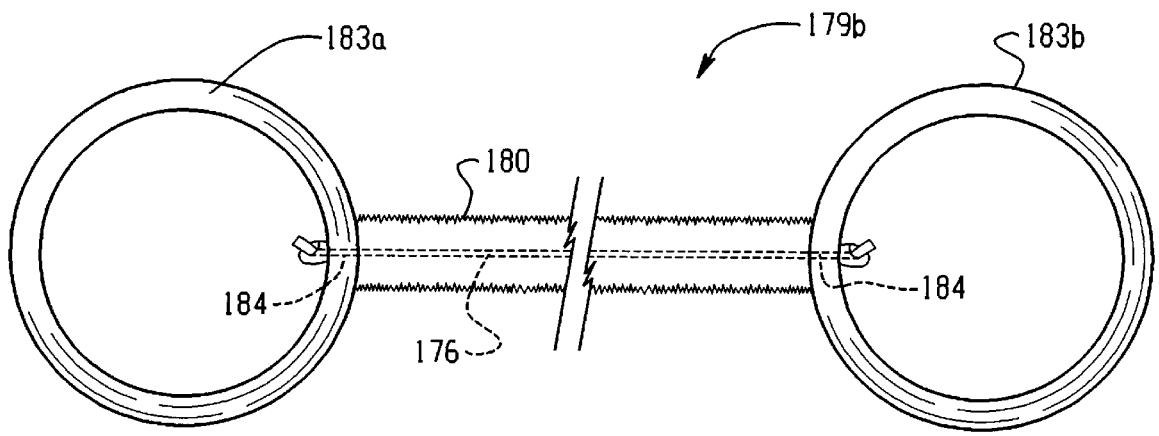
Figure 11D:
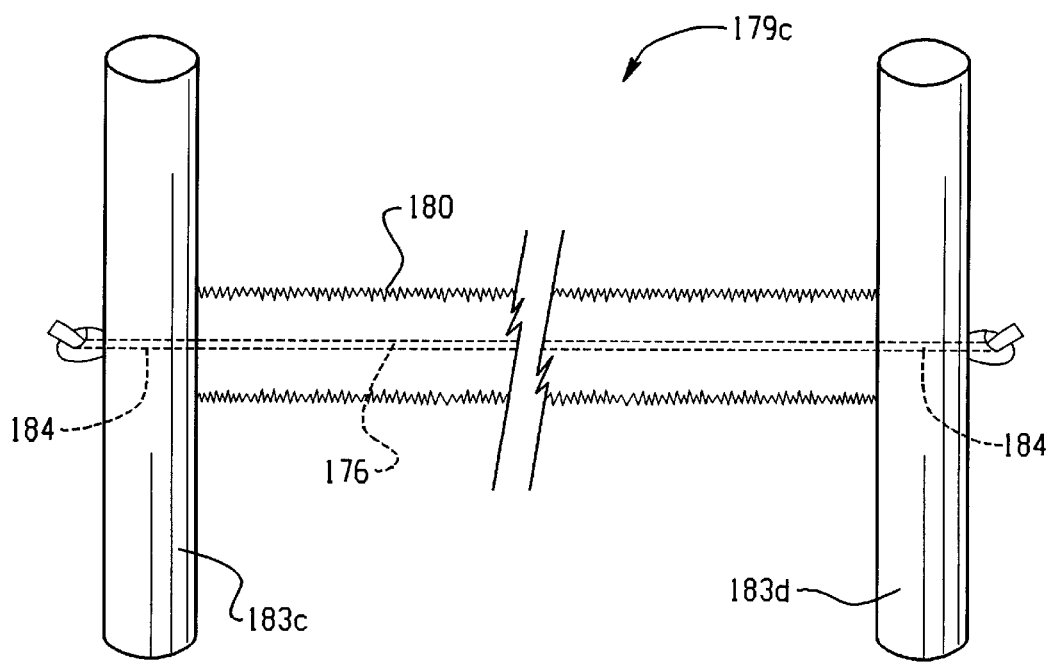

Referring now to FIG. 11A, a thin, elongate assembly 175 used to form the cleaning surfaces of the gear cleaner of the present invention is shown. The assembly 175 includes two wires 176a, 176b that have been twisted into interlocking spirals with a plurality of coarse fiber elements 177 and a plurality of fine fiber elements 178 clamped between the interlocked wires 176a, 176b. The right hand portion of FIG. 11A shows the assembly 175 with all but a few of the fine fiber elements removed to show the coarse fiber elements 177 and the wires therebeneath. The coarse fiber elements 177 can be made of thin polypropylene cut into strips about $\frac{1}{32}$ of an inch wide. The coarse fiber elements are inserted between the two wires at a density of about eighteen fibers per inch. The fine fiber elements 178 can be made of very fine polyester fibers and are placed between the wires 176a, 176b so densely that the wires 176 cannot be seen without removing some of the fine fiber elements 178. The assembly 175 is roughly cylindrical in cross section and has a diameter of about $\frac{5}{16}$ of an inch or about 8 mm. The wires 176 are preferably flexible so that the assembly 175 is flexible enough to be readily shaped and conform to the highly irregular and inaccessible gear teeth, e.g., more flexible than a common test tube or bottle brush. It can be shaped and twisted to change its diameter, rigidity, and abrasiveness. The assembly 175 can be made in any of a number of commonly known methods of manufacturing structures with fibers held between two intertwined wires, e.g., pipe cleaners, garland, artificial Christmas tree limbs, etc. The assembly 175 can be purchased from B. J. Long 466 Central Avenue, Rochester, N.Y. 14605 as a custom assembly specified by the following parameters: 14 inches in length, outer diameter of 8 mm, dense polyester fill, with alternating abrasive polypropylene bristles at 18 bristles per inch. During use, the fine fiber elements 178 hold water or another solvent and provide a slight cleaning action and the coarse fiber elements 177 provide a more abrasive cleaning action as the assembly 175 is sawed back and forth to clean the gaps between gear teeth and spaces between the gear plates themselves. The assembly 175 can be used in long (e.g., fourteen-inch) lengths without further modification or can be formed into a gear cleaner unit 179, exemplary embodiments of which are shown in FIGS. 11B–11D. These lengths can be rinsed, reused, and discarded after a number of uses (e.g., after ten cleanings).

Referring now to FIGS. 11B–11D, exemplary embodiments 179a, 179b, and 179c of gear cleaner units 179 made from the assembly 175 are shown. All three of the embodiments of the gear cleaner 179 of the present invention include a length 180 of the assembly 175; the difference is in how they are held by the user. The embodiment 179a of FIG. 11B has two loops 181a, 181b made of the assembly 175 and formed by wrapping the wires 176 at the end around the wires inside the length 180 at points 182a, 182b. In the alternative, the gear cleaner 179 can have handles secured to the length of cleaning material 180. The embodiment 179b of FIG. 11C has loops 183a, 183b as handles and the embodiment 179c of FIG. 11D has dowels 183c, 183d as handles. The handles 183 can be secured to the length of cleaning material 180 in many ways, such as passing the wires 176 (with any fiber elements removed) through openings 184 and secured by, e.g., knotting the wire 176 or wrapping the wire 176 around the handle 183. The handles 183 can either be discarded with the used material 175 after several cleanings or can be reused by changing the used lengths 180 with clean lengths of the material 175. Two or more lengths 180 can be twisted together to provide additional rigidity and abrasiveness.

Figure 11E:
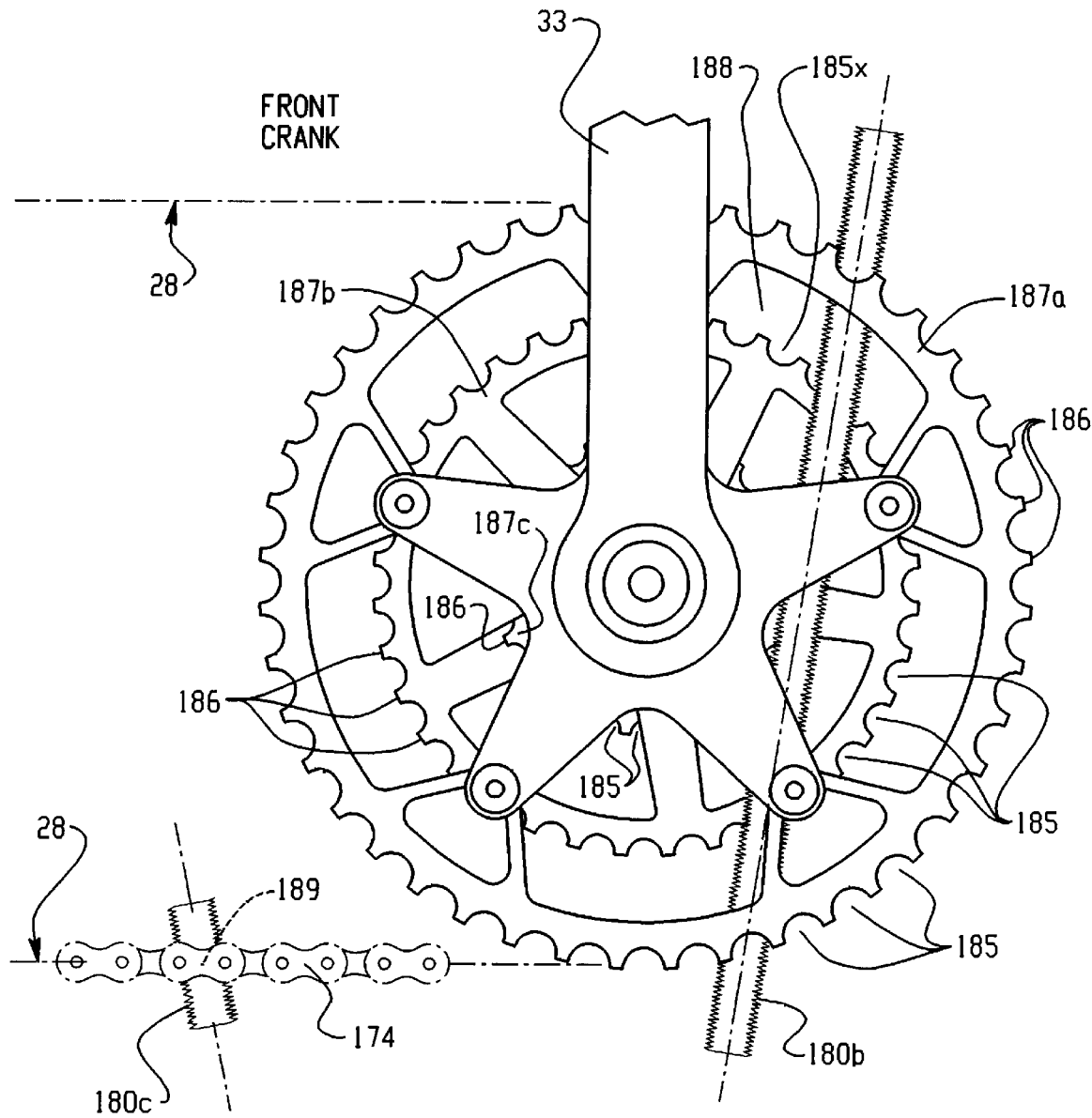
FIGS. 11E and 11F are side and front elevational views showing the gear cleaner of the present invention being used to clean the three chain rings (between the rings themselves and between the teeth thereof) of a bicycle crank.
Figure 11F:
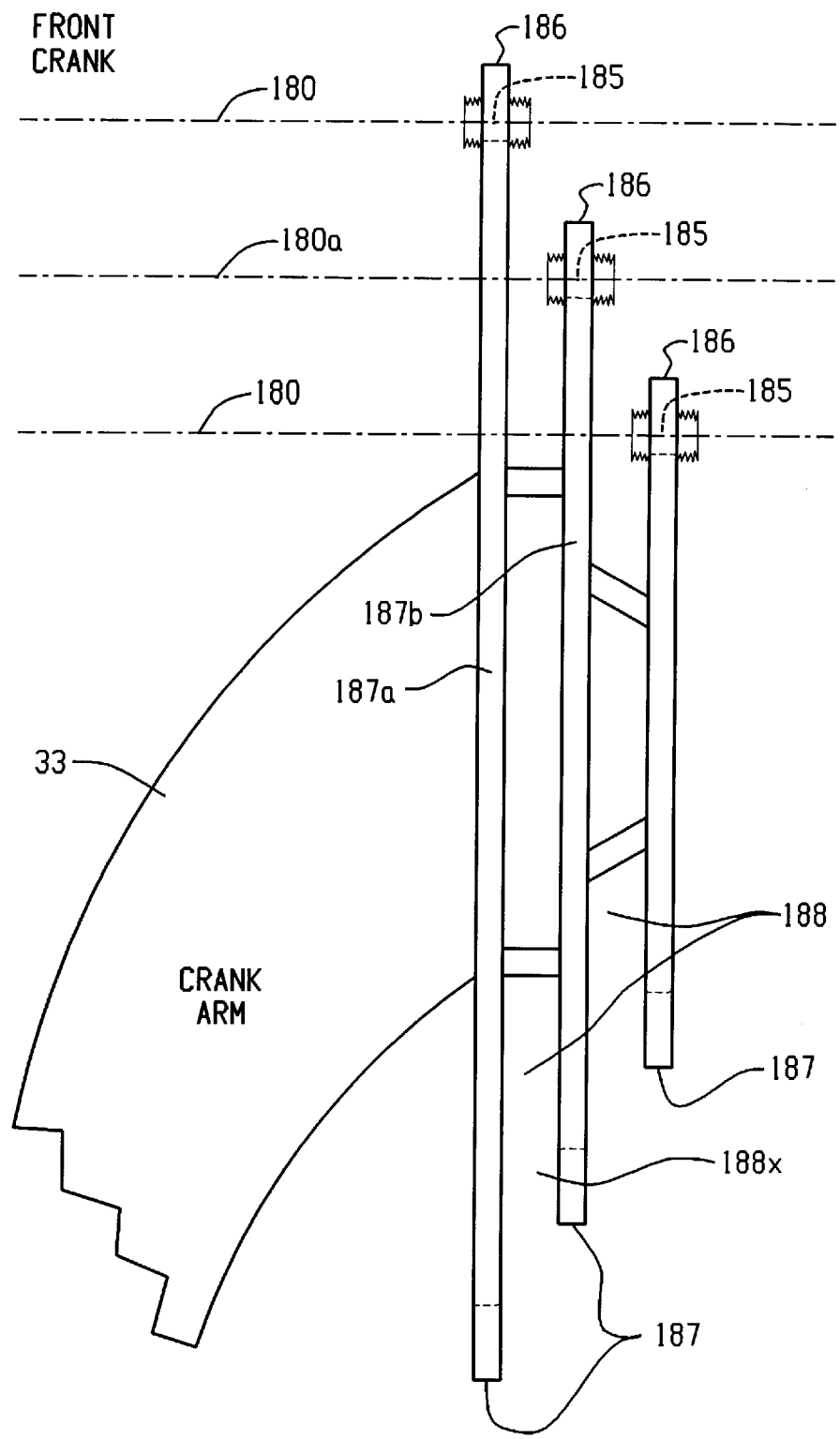
Figure 11G:
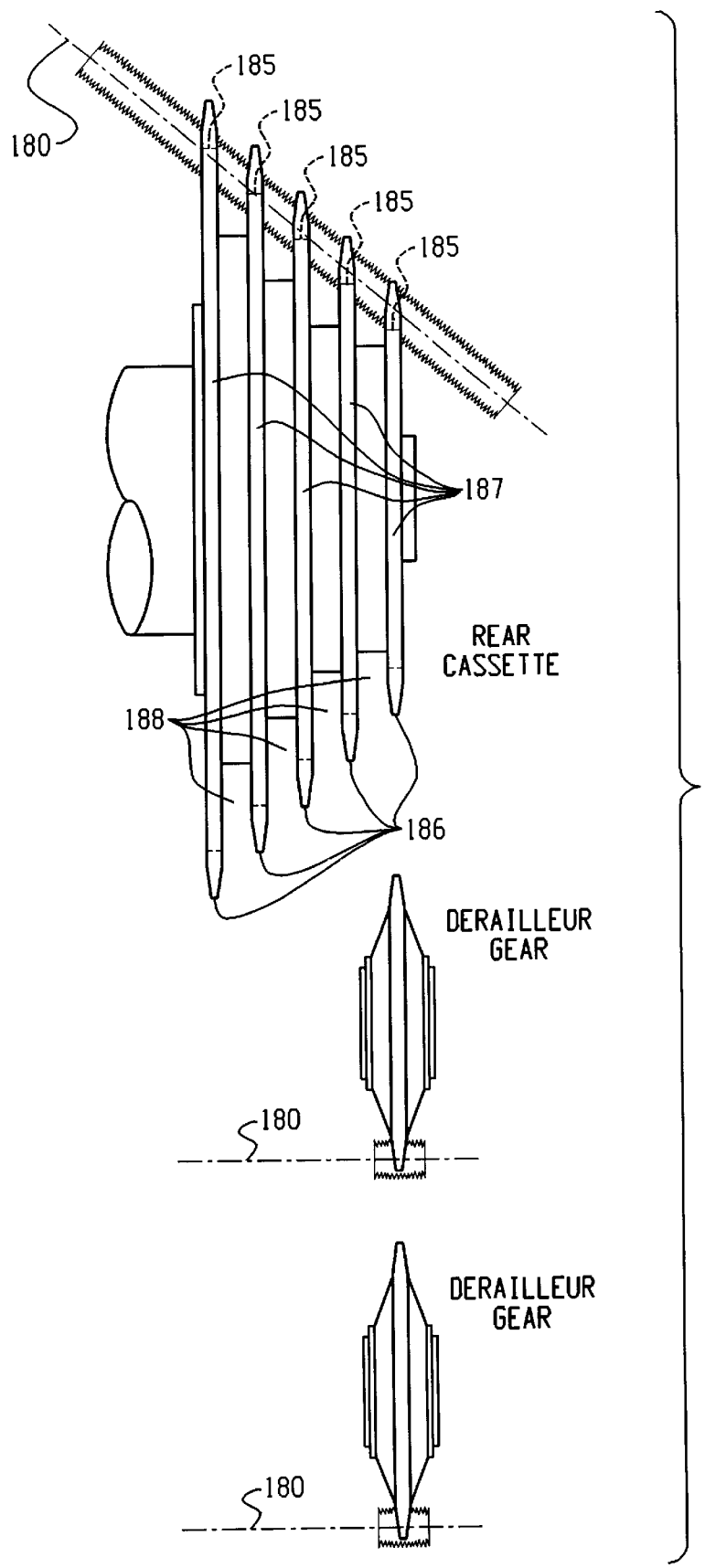
FIG. 11G is a rear elevational view showing the gear cleaner of the present invention being used to clean the gear plates of a bicycle rear cassette and derailleur gears.

As shown in FIGS. 11E–11G, the gear cleaner 179 (or likewise a length 180 of assembly 175) can be used to clean the spaces 185 between the gear teeth 186 of gear plates 187 (FIGS. 11F and 11G) and between the gear plates 187 themselves (FIG. 11E). If the construction of the particular bicycle permits, the gear cleaner 179 (or length of assembly 175) can be passed through openings 188 to facilitate cleaning a particular gap 185 between two teeth. For example, in cleaning the gap 185x, the gear cleaner is wetted with water or other solvent, passed through opening 188 (FIG. 11E), placed in contact with gap 185x, and moved back and forth in a sawing motion while being held in the position of 180a (FIG. 11F). In the case of a rear cassette (FIG. 11G), there might not be any spaces into which one can insert the gear cleaner 179; in that case one angles the gear cleaner 179 (or length of material 175) to contact the gap being cleaned and uses a sawing motion as best as one can. One cleans the space 188x between plates 187a and 187b (FIG. 11F) by inserting the gear cleaner 179 (or length of assembly 175) between these plates (180b in FIG. 11E) and moving it back and forth in a sawing motion to clean the exposed areas between these two plates. As also shown in FIG. 11E, a length of assembly 175 can be used to clean the inside surface 189 of the chain 28, which may also further clean the rollers 173.

Figure 12C:
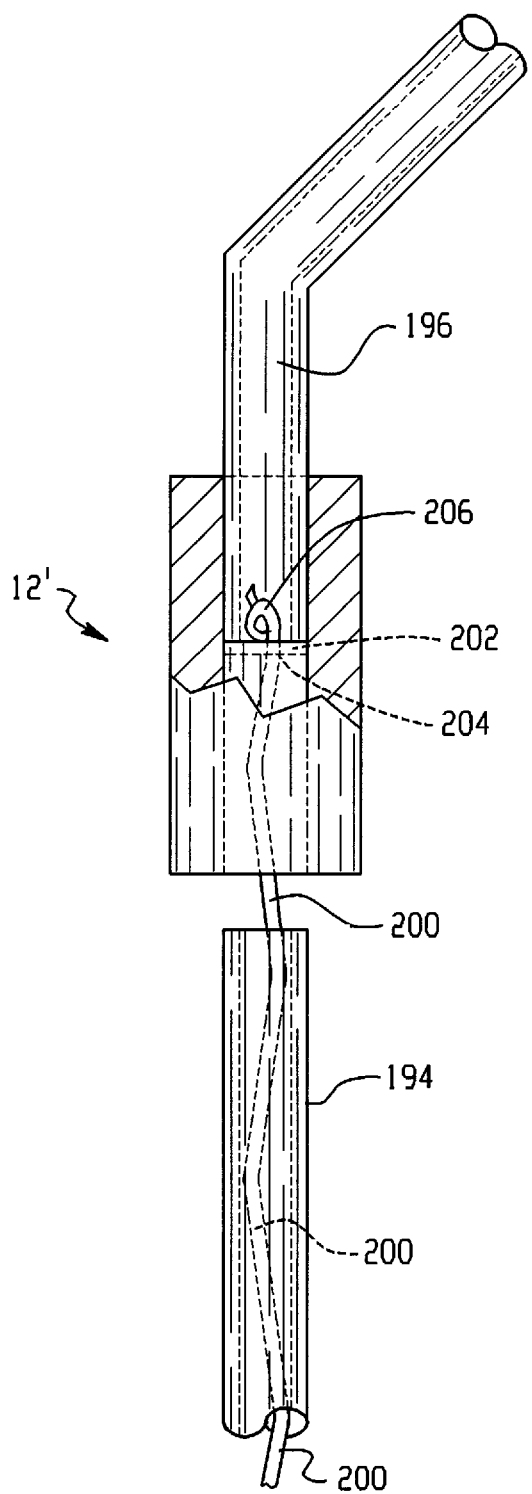
FIG. 12C is a view partly in section and partly in elevation showing a grommet of the embodiment of the cycle stand shown in FIGS. 12A and 12B.

Referring now to FIGS. 12A–12C, an alternative embodiment 12' of the stand of the present invention is shown. This embodiment 12' is identical to the embodiment of FIGS. 2A and 2B, except the alternative embodiment 12' is made substantially from hollow one-inch tubing, is made in a plurality of sections connected by ferrules, and has a "shock cord" (i.e., a covered plurality of relatively strong elastic cords) extending through its hollow center. Consequently, the stand 12' is truly portable. The stand shown in FIGS. 12A and 12B has a base section 190, a pair of straight sections 192, 194, and a top section 196. The top section 196 has physically annexed thereto a pig tail hook identical to the pig tail hook 14 described above. A plurality of ferrules 198, 199 connects the various sections, as shown in FIGS. 12A–12C. The embodiment 12' preferably has a shock cord 200 extending entirely through sections 192 and 194 and ferrules 198 and 199. Although ferrules are shown in FIGS. 12A–12C, the pieces of stand 12' can be connected with other connectors, such as threaded portions, bayonet-type connections, snap-together joints, a tapered portion of one piece (e.g., piece 192) being inserted into the end of another piece (e.g., piece 194), etc. The shock cord 200 is physically annexed to the top section 196 and the base 190 by any suitable means, e.g., a plate 202 having a hole 204 extending therethrough with a knot 206 of shock cord 200 securing the cord 200 on one side of the hole 204 in the plate 202, as exemplified by FIG. 12C. The shock cord 200 is preferably of a length such that with the pieces 190, 192, 194, 196, 198, 199 assembled in their to-be-used position of FIGS. 12A and 12B, the shock cord 200 applies a force that tends to maintain the pieces in that position. However, that force cannot be so high as to make disassembly difficult, since this particular embodiment is intended to be readily disassembled and held together as a bundle that is secured with the strap 82.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

I claim:

1. A cleaning system for cleaning a drive train of a cycle, the cycle having a frame, a seat post physically annexed to the frame, first and second wheels, and a chain operatively tensioned between at least one main gear and at least one wheel gear associated with the first wheel, the first wheel having a wheel axle associated therewith, the axle being retained in openings in the frame, said cleaning system comprising:

(a) a stand for retaining the seat post and thereby raising the first wheel of the cycle off of a supporting surface, said stand having a base for engaging the supporting surface, said base being operatively connected to an upright, said upright having associated therewith a pig tail hook, said pig tail hook having first and second surface portions positioned to engage the seat post in at least two different areas; said base, said upright, and said pig tail hook positioned so that with said stand in a supporting position, the cycle is supported on the supporting surface by the second wheel and said stand, with the force of gravity causing said pig tail hook to apply a retaining force to said seat post;

(b) a cleaning axle for maintaining tension on the chain when the first wheel is removed from the openings in the frame, said cleaning axle having an axle physically annexed to a chain supporting surface, said axle having dimensions allowing said axle to be retained in the openings in the frame, and said chain supporting surface providing tension to the chain while said axle is being retained in the openings in the frame and said chain supporting surface allowing said chain to be cycled by the at least one main gear; and (c) a tweezer brush having first and second cleaning surfaces operatively associated with a handle, said cleaning surfaces being spaced apart to allow the chain to pass therebetween, and said cleaning surfaces being positioned opposite one another so that said cleaning surfaces can engage opposite sides of the chain.

2. A cleaning system for cleaning a drive train of a cycle according to claim 1 wherein said cleaning axle has at least one cleaning port, said at least one cleaning port being positioned to direct a cleaning fluid toward the chain.

3. A cleaning system for cleaning a drive train of a cycle according to claim 2 further comprising a water nozzle, said water nozzle having a wand, said wand having an end with a diameter smaller than the at least one cleaning port of said cleaning axle for insertion into said at least one cleaning port to clean the chain being supported by said chain supporting surface, said end also having an opening allowing the fluid to exit said water nozzle.

4. A cleaning system for cleaning a drive train of a cycle according to claim 1 wherein said base and said upright of said stand are rigid parts that are rigidly connected to each other.

5. A cleaning system for cleaning a drive train of a cycle according to claim 1 wherein said base and said upright of said stand comprise at least two sections that are connected via at least one ferrule.

6. A cleaning system for cleaning a drive train of a cycle according to claim 5 wherein said at least two sections are hollow with an elastic cord extending therethrough to facilitate assembly of said base and said upright.

7. A cleaning system for cleaning a drive train of a cycle according to claim 1 wherein said base consists of a single base piece, wherein said upright comprises at least a first section and a second section, and wherein said base piece and said at least two sections are connected via at least two connectors, wherein said first section of said upright has said pig tail hook attached thereto, wherein at least said second section of said upright is hollow, wherein an elastic cord is attached to said base at one end and attached to said first section of said upright at another end, and further wherein said elastic cord extends through at least said second section of said upright.

8. A cleaning system for cleaning a drive train of a cycle according to claim 1 wherein said pig tail hook comprises a single piece of metal bent into a shape such that said first and second surface portions are formed by arcuate bends of said single piece of metal, said arcuate bends being positioned to engage the seat post in at least two different areas to support the cycle, with the force of gravity causing said arcuate bends to apply a retaining force to said seat post.

9. A cleaning system for cleaning a drive train of a cycle according to claim 1 wherein said cleaning surfaces of said tweezer brush comprise bristles carried by said handle.

10. A method of cleaning a drive train of a cycle, the cycle having a frame, a seat post physically annexed to the frame, first and second wheels, and a chain operatively tensioned between at least one main gear and at least one wheel gear associated with the first wheel, the first wheel having a wheel axle associated therewith, the axle being retained in openings in the frame, said method comprising the steps of:

(a) standing the cycle on a supporting surface using a stand, the stand retaining the seat post and thereby raising the first wheel of the cycle off of the supporting surface, said stand having a base for engaging the supporting surface, said base being operatively connected to an upright, said upright having associated therewith a pig tail hook, said pig tail hook having first and second surface portions positioned to engage the seat post in at least two different areas; said base, said upright, and said pig tail hook positioned so that with said stand in a supporting position, the cycle is supported on the supporting surface by the second wheel and said stand, with the force of gravity causing said pig tail hook to apply a retaining force to said seat post;

(b) removing the first wheel from the openings in the frame;

(c) inserting a cleaning axle into the openings in the frame, said cleaning axle for maintaining tension on the chain when the first wheel is removed from the openings in the frame, said cleaning axle having an axle physically annexed to a chain supporting surface, said axle having dimensions allowing said axle to be retained in the openings in the frame, and said chain supporting surface providing tension to the chain while said axle is being retained in the openings in the frame and said chain supporting surface allowing said chain to be cycled by the at least one main gear; and (d) cleaning the chain with a tweezer brush having first and second cleaning surfaces operatively associated with a handle, said cleaning surfaces being spaced apart to allow the chain to pass therebetween, and said cleaning surfaces being positioned opposite one another so that said cleaning surfaces can engage opposite sides of the chain.

11. A method of cleaning a drive train of a cycle according to claim 10 wherein said cleaning axle has at least one cleaning port, said at least one cleaning port positioned to direct a cleaning fluid toward the chain, and further comprising the steps of:

(a) providing a water nozzle, said water nozzle having a wand, said wand having an end with a diameter smaller than the at least one cleaning port of said cleaning axle for insertion into said at least one cleaning port to clean the chain being supported by said chain supporting surface, said end also having an opening allowing the fluid to exit said water nozzle;

(b) inserting said end of said wand into the at least one cleaning port of said cleaning axle; and (c) spraying the chain with the fluid from said end of said wand of said water nozzle.

12. A method of cleaning a drive train of a cycle according to claim 11 wherein said at least one main gear includes at least two main gear plates having space therebetween and wherein said at least one wheel gear includes at least two wheel gear plates having space therebetween, each of said main gear plates and said wheel gear plates having gear teeth with gaps therebetween, said method further comprising the steps of:

(a) providing a gear cleaner, said gear cleaner including a plurality of wires twisted into interlocking spirals with a plurality of fiber elements clamped therebetween;

(b) applying a solvent to said gear cleaner;

(c) inserting said gear cleaner into said spaces between said at least two main gear plates and cleaning said plates with said gear cleaner;

(d) inserting said gear cleaner into said spaces between said at least two wheel gear plates and cleaning said plates with said gear cleaner;

(e) inserting said gear cleaner into said gaps between said teeth of said at least two main gear plates and cleaning said gaps with said gear cleaner;

(f) inserting said gear cleaner into said gaps between said teeth of said at least two wheel gear plates and cleaning said gaps with said gear cleaner; and (g) rinsing said gear plates with the fluid from said end of said wand of said water nozzle.

13. A method of cleaning a drive train of a cycle according to claim 10 wherein said at least one main gear includes at least two main gear plates having space therebetween and wherein said at least one wheel gear includes at least two wheel gear plates having space therebetween, each of said main gear plates and said wheel gear plates having gear teeth with gaps therebetween, said method further comprising the steps of:

(a) providing a gear cleaner, said gear cleaner including a plurality of wires twisted into interlocking spirals with a plurality of fiber elements clamped therebetween;

(b) applying a solvent to said gear cleaner;

(c) inserting said gear cleaner into said spaces between said at least two main gear plates and cleaning said plates with said gear cleaner;

(d) inserting said gear cleaner into said spaces between said at least two wheel gear plates and cleaning said plates with said gear cleaner;

(e) inserting said gear cleaner into said gaps between said teeth of said at least two main gear plates and cleaning said gaps with said gear cleaner; and (f) inserting said gear cleaner into said gaps between said teeth of said at least two wheel gear plates and cleaning said gaps with said gear cleaner.

* * * * *